(12) United States Patent
Wang et al.

(10) Patent No.: US 9,749,060 B1
(45) Date of Patent: Aug. 29, 2017

(54) FRONT END CHARACTERIZATION OF COHERENT RECEIVER

(71) Applicant: Juniper Networks, Inc., Sunnyvale, CA (US)

(72) Inventors: Qiang Wang, Union City, CA (US); Yang Yue, Milpitas, CA (US); Murat Arabaci, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/985,754

(22) Filed: Dec. 31, 2015

(51) Int. Cl.
*H04B 10/61* (2013.01)
*H04B 10/564* (2013.01)
*H04J 14/06* (2006.01)

(52) U.S. Cl.
CPC ....... *H04B 10/6151* (2013.01); *H04B 10/564* (2013.01); *H04B 10/614* (2013.01); *H04J 14/06* (2013.01)

(58) Field of Classification Search
CPC . H04B 10/073–10/0731; H04B 10/532; H04B 10/614; H04B 10/6166; H04B 10/697–10/6971; H04J 14/06
See application file for complete search history.

(56) References Cited

U.S. PATENT DOCUMENTS

| | | | |
|---|---|---|---|
| 2006/0215175 A1* | 9/2006 | Yacoubian | G01N 21/1717 356/502 |
| 2009/0116844 A1* | 5/2009 | Tanaka | H04B 10/6971 398/115 |
| 2010/0239260 A1* | 9/2010 | Oikawa | H04B 10/07953 398/81 |
| 2011/0305457 A1* | 12/2011 | Kikuchi | H04B 10/5055 398/65 |
| 2013/0148967 A1* | 6/2013 | Tanimura | H03F 3/08 398/65 |

OTHER PUBLICATIONS

Gardner, "A BPSK/QPSK Timing-Error Detector for Sampled Receivers," IEEE Transactions on Communications, vol. COM-34, No. 5, May 1986, 423-429 pp.

* cited by examiner

*Primary Examiner* — David Payne
*Assistant Examiner* — Casey Kretzer
(74) *Attorney, Agent, or Firm* — Shumaker & Sieffert, P.A.

(57) ABSTRACT

Techniques are described for characterizing a receiver front end of a pluggable optical module. The pluggable optical module receives an optical signal that includes a first portion having a first polarization and a second portion having a second polarization. The first portion and second portion are not coherent with one another and the power of the first portion and second portion is equal.

26 Claims, 16 Drawing Sheets

FRONT END CHARACTERIZATION OF COHERENT RECEIVER

TECHNICAL FIELD

This disclosure relates to optical communication, and more particularly, to coherent optical communication system.

BACKGROUND

With the increase in the amount of data that needs to be communicated, optical communication systems need to evolve to operate at higher data rates. For instance, some recent optical communication systems operate in the 100 gigabits per second (Gbps) range. Scaling to these types of high data rate optical communication systems present design challenges for maintaining signal integrity not only due to the higher bandwidth, but also due to the complex modulation formats.

SUMMARY

In general, this disclosure describes techniques for properly characterizing a front end of a coherent receiver of an electronic device. The coherent receiver, or just receiver, refers to combination of an optical module that receives an optical data signal, converts the optical data signal into analog data signals, and receive circuitry of a processor that reconstructs the data signals for further processing. The front end of the coherent receiver, referred to as receiver front end, includes portions of the optical module that receive the optical data signal, convert the optical data signal into the analog data signals, and analog-to-digital converters (ADCs) that convert the analog data signals into digital data signals, as well as any components or traces that interconnect these various components together. The ADCs may be part of the processor (e.g., part of the receive circuitry) or external to the processor.

To properly characterize the receiver front end (e.g., determine frequency response, gain imbalance, etc.), the optical signal that the receiver front end receives should have approximately equal optical power in both polarizations. Otherwise, it is unclear whether the determined characteristics are truly the characteristics of the receiver front end or due to the differences in the optical power present in different polarizations. One way to ensure that the optical signal has approximately equal optical power in both polarizations is to cause the phases of the portion of the optical signal having a first polarization and the portion of the optical signal having a second polarization to be non-coherent with one another (e.g., the phases of the two portions are not fixed, but are relatively random). For instance, the optical signal that the receiver front end receives should have approximately equal optical power in both polarizations, and the portion of the optical signal that is polarized in one direction should not be coherent with the portion of the optical signal that is polarized in the other direction.

In techniques described in this disclosure, the processor of the electronic device, such as a wavelength division multiplexing (DWDM) line-card, switch, router or other device such as a chassis housing any of these devices, determines characteristics of a receiver front end based on a polarization-multiplexed optical signal received by a coherent receiver. The polarization-multiplexed optical signal includes optical signal portions having different polarizations. However, the optical signal portions having the different polarizations are not coherent with another, and the optical signal resulting from polarization-combining the optical signal portions having these different polarizations may be considered as de-polarized light. This disclosure describes example ways for characterizing a receiver front end with an optical signal having portions with different polarizations that are not coherent with one another.

In one example, the disclosure describes a method for optical communication, the method comprising receiving, with an optical module of a receiver, a polarization-multiplexed optical signal that includes a first portion having a first polarization and a second portion having a second polarization, wherein the first portion and the second portion are not coherent with one another and a power of the first portion is equal to a power of the second portion, determining, with a processor, characteristics of a front end of the receiver based on the received polarization-multiplexed optical signal, the front end comprising components of the optical module for converting optical signals into analog electrical signals, components of the receiver for converting the analog electrical signals into digital signals, and components and traces of the receiver that interconnect the optical module and the processor, and applying, with the processor, compensation to electrical signals received by the processor based on the determined characteristics.

In one example, the disclosure describes an electronic device for optical communication, the electronic device comprising a receiver having an optical module configured to receive a polarization-multiplexed optical signal that includes a first portion having a first polarization and a second portion having a second polarization, wherein the first portion and the second portion are not coherent with one another and a power of the first portion is equal to a power of the second portion, and a processor configured to determine characteristics of a front end of the receiver based on the received polarization-multiplexed optical signal, the front end comprising components of the optical module for converting optical signals into analog electrical signals, components of the receiver for converting the analog electrical signals into digital signals, and components and traces of the receiver that interconnect the optical module and the processor, and apply compensation to electrical signals received by the processor based on the determined characteristics.

In one example, the disclosure describes a system for optical communication, the system comprising a transmitter configured to transmit a polarization-multiplexed optical signal that includes a first portion having a first polarization and a second portion having a second polarization, wherein the first portion and the second portion are not coherent with one another and a power of the first portion is equal to a power of the second portion, and an electronic device comprising a receiver having an optical module configured to receive the polarization-multiplexed optical signal, and a processor configured to determine characteristics of a front end based on the received polarization-multiplexed optical signal, and apply compensation to electrical signals received by the processor based on the determined characteristics, wherein the front end comprises components of the optical module for converting optical signals into analog electrical signals, components of the receiver for converting the analog electrical signals into digital signals, and components and traces of the receiver that interconnect the optical module and the processor.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
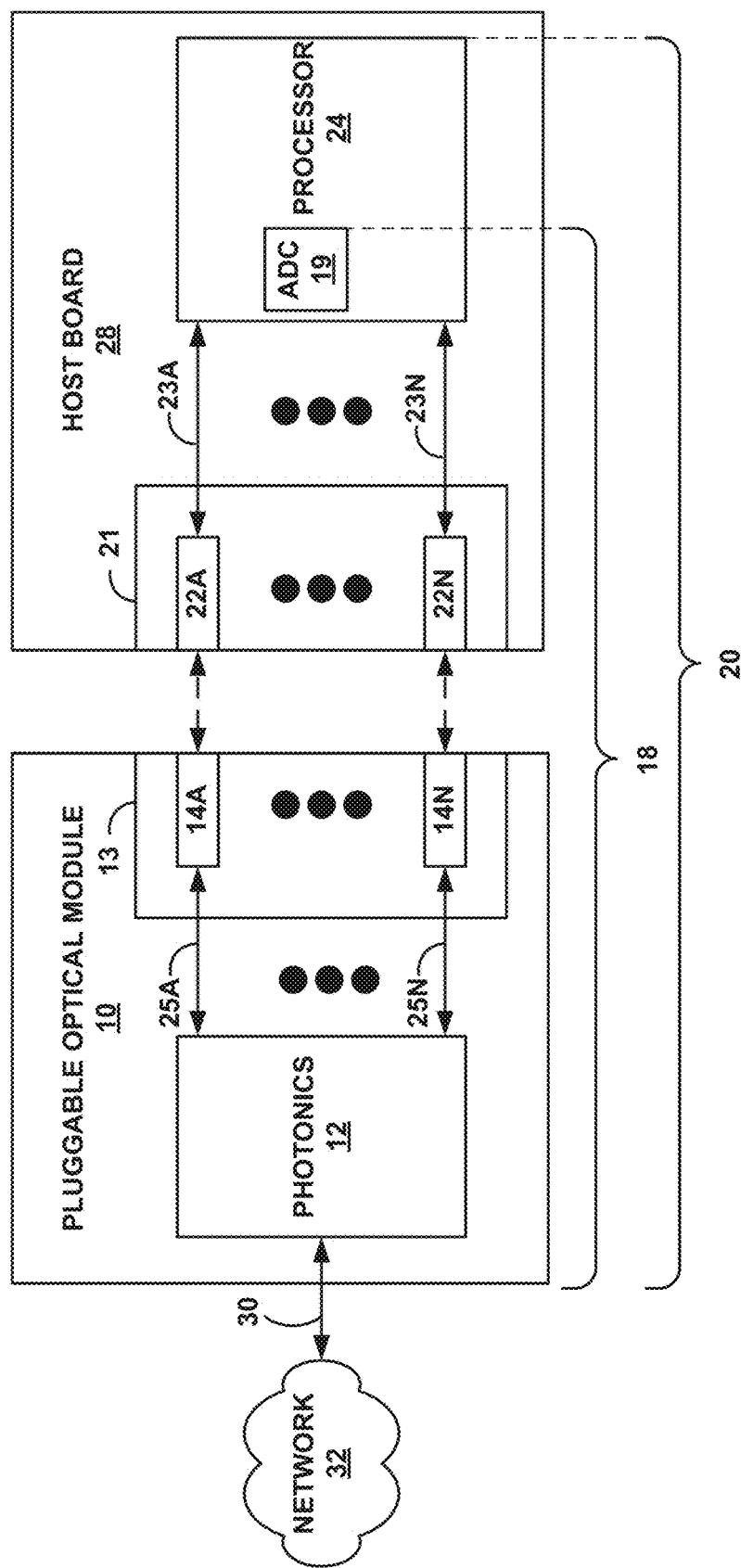
FIG. 1 is a block diagram illustrating an optical module coupled to a host board in accordance with one or more examples described in this disclosure.

FIG. 1 is a block diagram illustrating pluggable optical module 10 coupled to host board 28 in accordance with one or more examples described in this disclosure. The combination of pluggable optical module 10 and host board 28 represents a network device or a portion thereof. Host board 28 is referred to as a host board in that it "hosts" pluggable optical module 10. That is host board 28 typically includes an electrical interface for receiving and mating with an electrical interface of pluggable optical module 10. Pluggable optical module 10 may be a removable module that may be physically received by and removed from host board 28 within a communication system or device. In other words, pluggable optical module 10 may be removably coupled to the electronic device (e.g., host board 28). Pluggable optical module 10 and host board 28 typically are components of an optical communication device or system (e.g., a network device) such as a wavelength-division multiplexing (WDM) system, including a dense wavelength division multiplexing (DWDM) system. For example, a WDM system may include a plurality of slots reserved for a plurality of boards, such as host board 28. Host board 28 is an example of a line card used in WDM systems. Each host board 28 may receive one or more removable "pluggable" photonics module 10 to provide optical connectivity for one or more optical links 30. However, aspects of this disclosure are not limited to WDM systems. For purposes of illustration only and for ease of description, the examples are described in context of a WDM system.

As illustrated, host board 28 includes processor 24. In this disclosure, pluggable optical module 10 and processor 24 together form coherent receiver 20. For example, pluggable optical module 10 receives an optical data signal, converts the optical data signal into analog electrical data signals, and outputs the analog electrical signals to processor 24. Receive circuitry within processor 24 further process the analog electrical signals and reconstruct the data. In this disclosure, the components of pluggable optical module 10 that receive the optical data signal and convert the optical data signal into analog electrical data signals, the receive circuitry of processor 24 and all components and traces that interconnect processor 24 to optical module 10 form receiver 20.

Receiver 20 includes front end 18, which includes a subset of the components of coherent receiver 20. For example, front end 18 includes the components of pluggable optical module 10 that receive the optical data signal and convert the optical data signal into analog electrical data signals, components that convert the analog electrical data signals into digital electrical data signals, and all components and traces that interconnect processor 24 to optical module 10. As described in more detail, this disclosure describes examples for characterizing front end 18.

In a WDM system, an electronic device may be a chassis that may house various types of devices such as routers, servers, and the like, and may include host board 28. Host board 28 or another board connected to host board 28 receives a plurality of lower data rate optical or electrical signals from multiple devices such as switches or routers that host board 28 or the other board serializes together into higher data rate electrical signals. Pluggable optical module 10 converts the electrical signals to an optical signal for further transmission into network 32 via optical link 30. Examples of network 32 include, but are not limited to, a wide area network (WAN).

In the reverse, pluggable optical module 10 receives higher data rate optical signals via optical link 30 from network 32, and converts the optical signals to electrical signals. Host board 28 receives the electrical signals from pluggable optical module 10, and host board 28 or the other board deserializes the electrical signals into a plurality of lower data rate optical or electrical signals for transmission to the routers and switches.

As the amount of data that needs to be transmitted to and received from network 32 increases, the data rate at which host board 28 needs to forward to and receive from the routers and switches or the number of parallel lanes between host board 28 and the routers or switches increases. For example, as routers and switches are being designed to receive and transmit data at ever higher data rates, the WDM systems need to scale to the higher data rates to keep pace with data rates from the routers and switches. For instance, it may have been sufficient for host board 28 and pluggable optical module 10 to operate at approximately 10 Gbps, but now need to operate at 100 Gbps and beyond.

Scaling from 10 Gbps to 100 Gbps and beyond presents several design and cost challenges. For example, 10 Gbps data rate is sufficiently slow to allow simple modulation schemes such as on-off keying (OOK), sometimes referred to as non-return-to-zero (NRZ) modulation. In OOK modulation, the presence of a carrier wave for a specific duration represents a binary one, and its absence for the same duration represents a binary zero. However, OOK modulation may not be suitable at 100+ Gbps, and more complex modulation schemes may be necessary. For example, hardware components may not be able to process OOK modulated data at the relatively high rate of 100 Gbps.

In some examples, 100 Gbps may require phase-shift keying (PSK) such as quadrature phase-shift keying (QPSK), as one example, although other modulation schemes are possible such as polarization-multiplexed QPSK (PM-QPSK), M-ary quadrature amplitude modulation (M-QAM), or PM-M-QAM, where M≥4. For purposes of illustration, the example techniques are described with respect to QPSK modulation, and in particular PM-QPSK modulation. However, aspects of this disclosure should not be considered so limiting. The techniques described in this disclosure are extendable to other modulation schemes such as those used for coherent optical communication systems. For instance, QPSK. PM-QPSK, M-QAM, and PM-M-QAM modulation schemes may each require coherent optical detection, and pluggable optical module 10 and host board 28 may be considered as being part of a coherent optical communication system.

Coherent optical communication systems refer to optical systems that utilize both magnitude and phase information for transmitting and receiving data such as for phase-shift keying or quadrature amplitude modulation (e.g., QPSK, PM-QPSK, M-QAM, or PM-M-QAM modulation). For example, as illustrated in more detail with respect to FIGS. 3A and 3B, photonics 12 of pluggable optical module 10 may include lasers and phase and amplitude modulating optical hardware to mix pairs of data streams received from host board 28 for transmission as a single optical signal. Photonics 12 may also include the optical hybrid mixers to convert the received optical signal into the pairs (e.g., in-phase and quadrature) of data streams, referred to as I and Q data streams, for transmission to host board 28.

In QAM modulation, binary ones and zeros are represented by changing, or modulating, both the magnitude and the phase of a carrier wave sometimes referred to as a lightwave. In this manner, both the magnitude and the phase of the optical signal are used to transmit data. For example, both the magnitude and the phase information of the received optical signal may be needed to recover the transmitted data.

In some examples, in addition, the modulated lightwave in one polarization may be multiplexed with another modulated lightwave in another polarization, which may be orthogonal to the previous one, to produce a polarization-multiplexed (PM) signal, such as PM-M-QAM, an example of which is PM-QPSK where M=4. The polarizations of the lightwave signals may be chosen to be orthogonal to allow for a simple polarization beam splitter or polarizer to be used for polarization demultiplexing when photonics 12 receives data from network 32.

In this way, PM-QPSK may be considered as a combination of two QPSK optical signals (e.g., lightwave signals), where a first QPSK optical signal is for a first polarization of the lightwave, and the second QPSK optical signal is for a second polarization of the lightwave. Each of the QPSK optical signals utilizes four phases to encode two bits per symbol. Accordingly, PM-QPSK modulation utilizes four phases to encode two bits per symbol per polarization, which results in four bits per symbol.

For example, PM-QPSK modulation uses two input electrical data streams per polarization to impart the complex information on the optical carrier. The electrical signal for each polarization contains a pair of in-phase (I) and quadrature (Q) data streams that represent the complex data waveform. For example, in PM-QPSK modulation, there may be two in-phase data streams and two quadrature data streams, and one I data stream and one Q data stream forms one pair of a complex number, and the other I data stream and the other Q data stream forms another pair of a complex number. Each of the in-phase and quadrature data stream pairs may be nominally orthogonal to one another, in polarization, once the electrical data streams impart their complex information on the optical carrier. Each of these I or Q electrical data streams can be single-ended or differential. For OOK modulation, a single data stream is sufficient to impart the data on the lightwave, and similarly, a single data stream is sufficient to recover the data after detection by a photodetector.

In other words, in PM-QPSK modulation, the input optical signal includes two optical signals that are polarized orthogonally with respect to one another (e.g., one is horizontally polarized light, and the other is vertically polarized light, as an illustrative example). However, the polarization need not always be horizontally and vertically polarized light, but should be orthogonal with each other. For ease of description, one of the optical signals may be referred to as an optical signal with polarization X (e.g., horizontal polarization), and the other as an optical signal with polarization Y (e.g., vertical polarization). Each of the optical signals may be associated with a particular magnitude and phase. The magnitude and phase of each of the optical signals may be represented as a complex signal that includes real and imaginary aspects (the terms real and imaginary are used to distinguish the signals, and not to imply that "imaginary" portion is not present).

As an example, processor 24 of host board 28 outputs an in-phase electrical signal for polarization X, referred to as XI, and a quadrature electrical signal for polarization X, referred to as XQ, and outputs an in-phase electrical signal for polarization Y, referred to as YI, and a quadrature electrical signal for polarization Y, referred to as YQ. The magnitude and phase of the optical signal having polarization X is based on the value of XI and XQ, and the magnitude and phase of the optical signal having polarization Y is based on the value of YI and YQ.

This relative increase in modulation complexity (e.g., from OOK modulation to QAM modulation) and signaling rate present a design challenge for scaling a WDM system. For example, additional care may need to be taken to maintain signal integrity because of the high data rate and the complex modulation. For instance, because PM-QPSK modulation results in a plurality of data streams (e.g., two pairs of I and Q data streams), with each pair representing both magnitude and phase information of the optical signal, care may need to be taken to ensure that the signal integrity for the pairs of data streams is maintained to properly recover both the magnitude and phase information of the received optical signal.

In examples described this disclosure, the photonics for a relatively higher data rate WDM system (e.g., a 100 Gbps WDM system) is considered to reside in a pluggable module, such as pluggable optical module 10, rather than on host board 28. In this manner, photonics functions such as mixing of optical I and Q data stream pairs for PM-QPSK occur within pluggable optical module 10, and other functions such as ADC, DAC and digital signal processing (DSP) functions occur on a different board such as host board 28 or another board coupled to host board 28 that is further downstream, rather than both functions occurring on a common board. However, the optical module that houses the photonics need not necessarily reside in a pluggable module in all cases, and may reside directly on host board 28.

For instance, the techniques described in this disclosure can also be used when both functions are performed on a common board (e.g., host board with processor and on-board optics). For example, rather than being pluggable, an optical module including components similar to those of pluggable optical module 10 may be hardwired to host board 28 that includes processor 24. When the optical module is hardwired to host board, the optical module need not be separately housed or otherwise detachable. The term "optical module" is therefore used to refer to the components that provide electrical-to-optical conversion for transmission and optical-to-electrical conversion for reception. For purposes of illustration, this disclosure describes pluggable optical module 10, but the techniques are not limited to only pluggable optical modules.

In examples where optical module 10 is pluggable, the pluggable design allows the owner to defer photonics costs. For example, the owner may pre-populate the 100 Gbps WDM system with a plurality of boards such as host board 28 for an eventual upgrade to 100 Gbps. The cost of host board 28 may be substantially less than the cost of the photonics needed for 100 Gbps. Then, when 100 Gbps data rates are needed, the owner purchases a plurality of pluggable modules such as pluggable optical module 10 and plugs each of these modules into respective ones of host board 28. In this manner, pluggable optical module 10 provides the owner with a "pay as you grow" market strategy by differing costs associated with the 100 Gbps photonics until the growth requires it.

Also, using pluggable optical module 10 provides the owner with vendor options. For example, one vendor may provide a better 100 Gbps version of pluggable optical module 10 compared to another vendor, and the pluggable design of pluggable optical module 10 allows the owner to select the better 100 Gbps version of pluggable optical module 10. Moreover, the owner may not know ahead of time whether there will be further advances in photonics technology, or whether the 100 Gbps WDM system will be needed for special use cases. With the pluggable design, the owner may have flexibility to upgrade to better versions of pluggable optical module 10, as well as flexibility to select the photonics module needed for the special use cases.

While the pluggable feature of pluggable optical module 10 is beneficial for the above reasons, there may be certain challenges. For example, the electrical and optical characteristics of different types of pluggable optical module 10 may be different. In this disclosure, electrical and optical characteristics refer to the impact on signal integrity by a particular component (e.g., pluggable optical module 10). For instance, the characteristics may define how much change has occurred between an input signal and an output signal.

As an example, assume that the output of pluggable optical module 10 is fed back to the input of pluggable optical module 10. In this example, if pluggable optical module 10 has no impact on the signal integrity of the electrical signal that pluggable optical module 10 receives, then the output of pluggable optical module 10 would be the same as the input to pluggable optical module 10 in the feedback configuration. However, more likely, pluggable optical module 10 would impact the signal integrity such that the input signal is different than the output signal in this feedback configuration. As described in more detail, the example techniques described in this disclosure provide a mechanism by which processor 24 is able to determine, during operation, the characteristics of pluggable optical module 10, as well as the signal path from pluggable optical module 10 to processor 24, so that processor 24 can utilize this information to compensate for the impact of those characteristics on the signal integrity.

For instance, as described above, an electronic device, such as one that includes pluggable optical module 10 coupled to host board 28, includes front end 18 (e.g., the front end of receiver 20), which includes the components of pluggable photonics module 10, one or more analog-to-digital converters (ADCs) 19, and the components that interconnect these components to one another. In this disclosure, ADCs 19 are part of processor 24, but may be external to processor 24, including residing on host board 28 or within pluggable photonics module 10. Front end 18 of such an electronic device (e.g., routers, servers, etc.) is analog because the signals received and processed by front end 18 are analog signals. The output of the ADCs are respective digital signals. Accordingly, in this disclosure, front end 18 is used to refer to those components that receive an analog signal, process the analog signal, and then output a digital signal, regardless of whether these components all reside within pluggable photonics module 10 or reside in a combination of pluggable photonics module 10 and processor 24. Similarly, coherent receiver 20 is used to refer to those components that include front end 18 and any additional components needed to reconstruct the data, such as those described in more detail with respect to FIG. 6.

The example techniques described in this disclosure allow for determining the characteristics of front end 18. Examples of the characteristics include frequency response shape and bandwidth, inter-channel (IQ) and intra-channel (XY) skew, gain imbalance and the like. Based on the determined characteristics, processor 24 may configure internal filters, equalizers, and like to compensate for the effects of the characteristics in digital domain.

The frequency response of front end 18 should generally be smooth. Any abrupt change may have a negative impact. For instance, insufficient receiver bandwidth may lead to a large penalty in the required optical signal to noise ratio (ROSNR) to attain a target bit error ratio (BER) and a penalty while compensating for chromatic dispersion (CD). Skew leads to degradation in the bit error ratio, and gain imbalance can cause distortions in the received constellation diagram that is used to properly determine the symbols, which also causes degradation in the bit error ratio. By compensating for the effects of the characteristics, processor 24 may keep the bit error ratio relatively low.

Because vendors use different components and different designs, the electrical and optical characteristics of pluggable optical module 10 may change based on the vendor.

The electrical and optical characteristics of pluggable module 10 may impact the signal integrity of the electrical signal that processor 24 receives. Also, because pluggable optical module 10 is "hot-pluggable" (e.g., pluggable after the device that houses host board 28 is operational), the exact type of pluggable optical module 10 may not be known ahead of time. Therefore, even if the electrical and optical characteristics of one type of pluggable optical module 10 were compensated for, the compensation may not be applicable for another type of pluggable optical module 10 or the compensation may result in sub-optimal performance. Furthermore, not only do the electrical and optical characteristics of pluggable optical module 10 impact the signal integrity, but the characteristics of the traces that the XI, XQ, YI, and YQ signals need to traverse may impact the signal integrity as well.

As illustrated, host board 28 includes pluggable interface 21 (e.g., an electrical and physical interface) and pluggable optical module 10 includes pluggable interface 13 (e.g., an electrical and physical interface), which mates with pluggable interface 21. Pluggable interface 13 and pluggable interface 21 mate with one another to couple pluggable optical module 10 to host board 28. With pluggable interface 13 and pluggable interface 21, pluggable optical module 10 can be selectively coupled to or decoupled from host board 28. For example, pluggable interface 21 is configured to removably couple pluggable optical module 10 to host board 28 or the device that houses host board 28.

Pluggable interface 13 includes connection points 14A-14N (collectively referred to as "connection points 14") and pluggable interface 21 includes connection points 22A-22N (collectively referred to as "connection points 22"). When pluggable optical module 10 couples to host board 28, connection points 14 mate with corresponding connection points 22 to provide a continuous electrical path for data transmission and reception between pluggable optical module 10 and host board 28.

For example, photonics 12 of pluggable optical module 10 receives a downstream optical signal from network 32 via optical link 30. In this example, the downstream optical signal is modulated in accordance with the PM-QAM (e.g., PM-QPSK) modulation scheme. Photonics 12 converts the downstream optical signal into two pairs of I and Q optical data streams, and converts the two pairs of I and Q optical data streams to two pairs of I and Q electrical data streams (referred to as pairs of I/Q electrical data streams for ease of reference). In this example, the pairs of I/Q electrical data streams together represent magnitude and phase information for the received signal. Photonics 12 transmits the pairs of I/Q electrical data streams to host board 28 via traces 25A-25N (collectively referred to as "traces 25") and the electrical path provided by the mating of connection points 14 to connection points 22.

Processor 24 receives the I/Q electrical data streams via traces 23A-23N (collectively referred to as "traces 23") where each trace may be a differential or single-ended transmission line. For example, host board 28 includes eight pairs of traces 23, assuming differential signals, for sixteen total traces. Eight traces 23 would be used for single ended, but the disclosure is described with respect to differential signals.

Four pairs of traces 23 are for processor 24 to receive the electrical signals (e.g., a pair of traces for XI, one pair of traces for XQ, one pair of traces for YI, and one pair of traces for YQ). In the upstream, processor 24 transmits the pairs of I/Q electrical data streams to photonics 12 via traces 23 (e.g., the remaining four pairs of traces of the eight pairs of traces) and the electrical path provided by the mating of connection points 22 to connection points 14. Photonics 12 receives the pairs of I/Q electrical data streams, and converts the pairs of I/Q electrical data streams into a single optical signal for upstream transmission to network 32 via optical link 30.

While pluggable optical module 10 may provide cost deferment and design flexibility, the pluggable design may degrade the signal integrity of the pairs of I/Q electrical data streams received or transmitted by host board 28. For example, the mating of connection points 14 to connection points 22 may result in a less than ideal connection between pluggable optical module 10 and host board 28, referred to as physical impairments of mating connection points 14 to connection points 22. For instance, connection points 14 and connection points 22 may not line up perfectly. Furthermore, even when connection points 14 and connection points 22 line up as close to ideal as possible, the connection between connection points 14 and connection points 22 may increase insertion loss that the signal experiences, as compared to the case where the components of pluggable optical module 10 were directly coupled to the components of host board 28 (i.e., the components of pluggable optical module 10 resided on host board 28 or processor 24 was consumed within pluggable optical module 10). Another source of impairment may be due to impedance mismatches between host board 28 and pluggable optical module 10, which would cause RF reflection in interface 13 or 22.

These physical impairments negatively impact the signal integrity of the pairs of I/Q electrical data streams. For example, the physical impairments distort the pairs of I/Q electrical data streams transmitted by photonics 12. They may distort both the amplitude of the pairs of the I/Q electrical data streams as a function of frequency and the phase of the pairs of the I/Q electrical data streams as a function of frequency (e.g., group delay as a function of frequency).

In examples where photonics module 10 is not pluggable, but instead hardwired directly on host board 28, the signal integrity impairments from the various connections may be reduced. However, there may still be other causes that impair signal integrity including the signal integrity impairments caused by limitations of the components (e.g., bandwidth, skew, etc. of the components). As noted above, although the techniques are described with respect to pluggable optical module 10, the techniques are not limited to examples where the optical module is pluggable, and applicable to examples where the optical module is hardwired with host board 28 that includes processor 24.

Also, similar to the physical impairments of connection points 14 and connection points 22, traces 23 also contribute to impact on the signal integrity. For example, the way in which traces 23 are laid out on host board 28 affects the signal integrity, the quality of the material of traces 23 affects the signal integrity, and the like. In addition, the interconnection with the chip die of processor 24 and the pad of processor 24, and the solder connection between the pad of processor 24 and footprint on host board 28 also affect the signal integrity.

As described above, receiver 20 includes pluggable optical module 10, processor 24, and the components that interconnect pluggable optical module 10 and processor 24. For instance, receiver 20 includes the components of photonics 12 for receiving an optical signal, converting the optical signal to analog electrical signals, traces 25, interface 13, interface 21, traces 23, and receive circuitry of processor 24. Front end 18 is a subset of receiver 20 and includes the components of photonics 12 for receiving an optical signal, converting the optical signal to analog electrical signals, traces 25 of receiver 20, interface 13 of receiver 20, interface 21 of receiver 20, traces 23 of receiver 20, and one or more ADCs 19 of processor 24. Accordingly, front end 18 comprises components of optical module 10 for converting optical signals into analog electrical signals, components of receiver 20 for converting the analog electrical signals into digital signals (e.g., ADCs 19), and components and traces of receiver 20 that interconnect optical module 10 and processor 24 (e.g., connection points 14 of interface 13, connection points 22 of interface 21, traces 23 and traces 25).

As described in more detail below, processor 24 includes one or more equalizers in the receive circuitry of coherent receiver 20 which can be dynamically configured to compensate for the impact of front end 18 including pluggable optical module 10. For example, processor 24 or possibly some other device may be configured to determine characteristics of front end 18, determine compensation parameters for the one or more equalizers of coherent receiver 20, and configure the one or more equalizers to apply compensation based on the determined compensation parameters. In this way, the one or more equalizers may modify the electrical signal received by processor 24 to correct for the impairments degrading the signal integrity.

Examples of processor 24 include, but are not limited to, a digital signal processor (DSP), a general purpose microprocessor, an application specific integrated circuit (ASIC), a field programmable logic array (FPGA), a combination thereof, or other equivalent integrated or discrete logic circuitry. In some examples, processor 24 may include other components for processing purposes such as ADCs 19 and DACs, as further described below. Furthermore, although the one or more equalizers are described as being internal to processor 24, aspects of this disclosure are not so limited. These one or more equalizers may be external to processor 24. Accordingly, host board 28 may be considered as including the one or more equalizers.

To determine the characteristics (e.g., the frequency response shape, bandwidth, skew, gain imbalance, etc.) of the front end 18, which comprises the signal path from the optical input of the pluggable optical module 10, via traces 25 and traces 23 and through connection point 14 and 22 to the output of the ADCs 19 within processor 24, pluggable optical module 10 should be provided with an appropriate input optical signal. During this characterization phase, processor 24 may apply no or some, well-known amount of compensation (e.g., compensation that can be de-embedded from the measurement to determine the actual characteristics of the front end 18). Processor 24 may then accurately determine the front end 18 characteristics, and in return, compute equalization necessary to be applied on the received signal to compensate for the signal integrity impairments caused by the front end 18.

In this disclosure, processor 24 is described as determining the characteristics of the front end 18. However, the techniques described in this disclosure are not so limited. In some examples, some other device may determine the characteristics of the front end 18. For instance, during manufacturing, a computing device (e.g., laptop, desktop, specialized hardware, etc.) may receive the output of ADCs 19 like those that reside within processor 24 or the output of the actual ADCs 19 that reside within processor 24 via a mode that bypasses the rest of processor 24. This computing device then determines the characteristics and outputs the characteristics to processor 24, from which processor 24 determines the compensation that is to be applied. As another example, this computing device determines the characteristics and the compensation that is to be applied and configures processor 24 to apply the determined compensation. For simplicity, processor 24 is described as performing the functions for determining the characteristics and the compensation that is to be applied, but these functions can be performed by a different device or performed by processor 24 in combination with another device.

The optical signal from which processor 24 determines the characteristics of the front end 18 may require optical power in both the X polarization and the Y polarization. For instance, pluggable optical module 10 and processor 24 together may form a coherent transceiver having coherent receiver 20 and a coherent transmitter (not explicitly called out with a reference numeral), where "coherent" is used to indicate that magnitude and phase of a modulated signal are used to convey information, and coherent detection using a local oscillator is used to recover information. Because pluggable optical module 10 outputs XI, XQ, YI, and YQ electrical signals, optical module 10 should receive an optical signal having X polarization and having Y polarization to generate these respective electrical signals. Conceptually, the optical signal can be considered as a combination of two optical signals, one signal having X polarization and another having Y polarization so that the combined optical signal has both components with X polarization and components with Y polarization.

The optical power of the component of the optical signal having the X polarization and the power of the component of the optical signal having the Y polarization should be approximately the same. This way, the outputs of the XI/XQ pair would be similar to the outputs of the YI/YQ pair. If the optical power of the optical signal having the X polarization was different than the optical signal having the Y polarization, processor 24 may falsely determine that the channel that processes the XI/XQ pair performs worse (e.g., has low bandwidth or low gain) than the YI/YQ pair, although the issue was with the received optical power and not with the capabilities of the front end 18.

Figure 2:
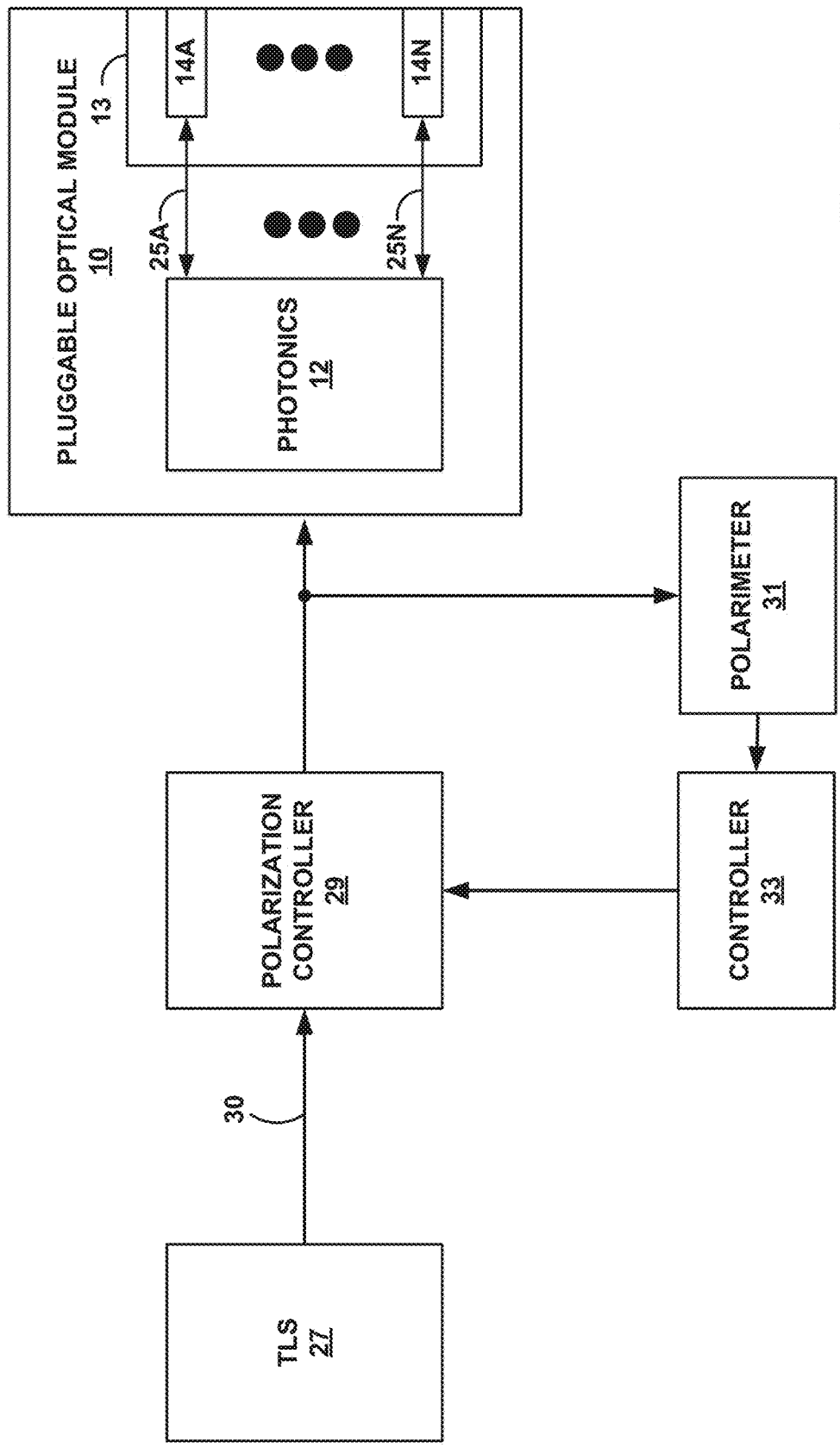
FIG. 2 is a block diagram illustrating one way in which to generate an optical signal having equal power on a first polarization and a second polarization.

FIG. 2 is a block diagram illustrating one way in which to generate an optical signal having equal power on a first polarization and a second polarization. In this example illustrated in FIG. 2, tunable laser source (TLS) 27 is a laser source that outputs an optical signal having X polarization and Y polarization. Optical signal in the optical fiber can be modeled as plane wave, where the electrical field is oscillating in the XY plane with Z denoting the direction of propagation of the optical signal. Electrical field can be viewed as a vector, which can be de-composed to two vectors that oscillate along two orthogonal directions of X and Y. Dependent on the phase difference and amplitude difference between X component and Y component, the vector of electrical field follows different trace along XY plane in the time domain. How the electrical field evolves in XY plane defines the state of polarization (SoP). In this example, TLS 27 may be part of network 32 or pluggable optical module 10 may be disconnected from network 32 and coupled to TLS 27.

The first portion (can be viewed as X polarization without losing generality) and the second portion (can be viewed as Y polarization without losing generality) may be coherent with one another and may be perfectly in phase. When the first and second portion as described as being coherent, it means that their phases are constant relative to one another. For the first and second portion to be in phase means that the phase difference between the two portions is zero. When the first portion and second portion are coherent and in phase, and there is equal amount of power in the X polarization and the Y polarization, the electrical field will oscillate along 45° direction or 135° direction in the XY plane. When this electrical field enters the polarization beam splitter (PBS) 42 in the receiver path, the optical power going to optical hybrid mixer 48A will be equal to the optical power going to optical hybrid mixer 48B. Equal amount of optical power to 48A and 48B provides fair baseline for further characterization and comparison of components in front end 18 of coherent receiver 20 because the determined characteristics are truly based on the components and not due to differing power on the input.

However, most examples of optical link 30 use single mode fiber and may not maintain the phase relationship between the first portion and the second portion. For instance, as the optical signal having the first portion and second portion travels along optical link 30, the phases of the first portion and second portion need not necessarily remain in phase, and start to deviate. For example, when the phase difference between first polarization and second polarization is 30°, the trace of electrical field in XY plane is ellipse. Therefore, if pluggable optical module 10 were to receive the optical signal directly from TLS 27 (e.g., if polarization controller 29 were not in the signal path), then there would be no guarantee that the amount of power on the first portion having the X polarization and the amount of power on the second portion having the Y polarization would be equal. In this case, if the front end 18 were characterized, processor 24 may not be able to determine whether the characteristics are truly of front end 18 or due to differing power on the portion having the X polarization relative to the power on the portion having the Y polarization. A worst-case scenario could be that electrical field oscillates along one polarization, thus there will be no power in the other polarization. Without knowing the input polarization, processor 24 may determine that some components in the other polarization are broken even when the components are functioning properly.

Accordingly, polarization controller 29 may be configured to set the polarization of the optical signal received from TLS 27. To ensure that the optical power is equal for both polarizations, polarimeter 31 may receive a portion of the output of polarization controller 29 and indicates the power of each of the polarized optical signals. Controller 33 receives the output of polarimeter 31, and adjusts parameters of polarization controller 29 so that optical power is equal in both polarizations.

As an example, controller 33 may cause polarization controller 29 to output an optical signal having only X polarization, confirm from processor 24 that there is no YQ/YI output, and perform the same steps but with only Y polarization. This way, controller 33 can confirm that the polarization controller is functioning properly. Controller 33 may then cause polarization controller 29 to output an optical signal where the polarization is set to 45° or 135°, as confirmed with polarimeter 31. With polarization set of 45° or 135°, the optical signal has the same amount of power in X polarization as it does in Y polarization. The value of 45° or 135° indicates the state of polarization of the optical signal.

Therefore, when single mode fiber (SMF) such as optical link 30 is used (which is generally the case for long distance optical communication systems), optical link 30 cannot maintain the state of polarization that is outputted by TLS 27 (e.g., whether in phase, so 0° of polarization, 45°, or 135°). Even if TLS 27 is coupled with a polarization controller 29 (and polarimeter 31 and polarization controller 33) at the transmitting end as in FIG. 2 and even if the output from polarization controller 29 is set at 45° or 135°, the input to pluggable optical module 10 can be changed to another state of polarization due to polarization rotation introduced by optical link 30 between polarization controller 29 and pluggable optical module 10. Accordingly, additional components like polarization controller 29 and components of a feedback control loop (e.g., polarimeter 31 and controller 33) may be needed close to the input of the pluggable optical module 10 since state of polarization cannot be maintained by optical link 30. Another example is to form a feedback control loop between the host board 28 and the external polarization controller 33 to accurately control the SoP of the input light to coherent receiver 20.

In this example illustrated in FIG. 2, the optical signal that polarization controller 29 outputs is heterodyne beated with the optical signal generated from a local oscillator within photonics 12 of pluggable optical module 10. The result of the beating is a signal whose frequency is the frequency difference between the frequency of the optical signal outputted by TLS 27 and the frequency of the optical signal outputted by the local oscillator of photonics 12. By sweeping the frequency of the optical signal outputted by TLS 27 relative to the frequency of the optical signal outputted by the local oscillator of photonics 12, processor 24 may determine the amplitude response versus frequency curve. During the frequency sweep, controller 33 may ensure that the polarization of the optical signal outputted by polarization controller 29 still includes the same amount of power in the X polarization as in the Y polarization as confirmed with polarimeter 31.

Processor 24 may determine the gain imbalance based on the difference in amplitude among tributary channels. One tributary channel refers to a single one of electrical outputs (e.g., one of XI, XQ, YI, or YQ). There may be two types of gain imbalances. One example of gain imbalance may be the difference between XI and XQ or YI and YQ. Another example of gain imbalance may be the difference in the XI/XQ pair relative to the YI/YQ pair.

Processor 24 may determine the skew based on the differences in slopes of the phases of the tributary channels. For example, the skew for XI/XQ may be based on a slope of a graph where the XI tributary channel forms one axis and the XQ tributary channel forms another axis. Similarly, the skew of YI/YQ may be based on a slope of a graph where the YI tributary channel forms one axis and the YQ tributary channel forms another axis. Another way to determine the skew is based on a rotation angle between the XI/XQ and YI/YQ tributary channels, as described in more detail below with respect to FIGS. 7A and 7B.

Using polarization controller 29, polarimeter 31, and a separate controller 33 adds costs and requires components that may not be readily present on the electronic device that houses host board 28 and pluggable optical module 10. Moreover, an active control loop is needed between polarization controller 29 and polarimeter 31 (or between the polarization controller 29 and host board 28) to maintain the state of polarization at 45° or 135° at the input of pluggable optical module 10. Therefore, determining the characteristics of the front end 18 while the electronic device that houses host board 28 and pluggable optical module 10 is in use (e.g., in the field after manufacturing) may be complicated.

Having a coherent optical signal where the state of polarization is fixed to 45° or 135° is one way to ensure that there is equal power in both the X polarization and Y polarization. However, there may be other ways to ensure that there is equal power in both the X polarization and Y polarization. For instance, if the coherence between the X polarization and Y polarization is broken (e.g., the portion having the X polarization and the portion having Y polarization are no longer coherent with each other and without constant phase relationship between them), then the electrical field generated from such an optical signal would have randomly distributed power in both the X polarization and Y polarization, meaning that there is a very high likelihood that the amount of power in the X polarization and Y polarization is the same. In this case, the resulting optical signal can be considered as a polarization-multiplexed optical signal having de-polarized output lightwave. When this type of light passes through optical link 30, any amount of phase change caused by optical link 30 does not change the nature that the light in X polarization is not coherent with the light in Y polarization. Thus the light stays de-polarized and there remains equal amount of power in X polarization and Y polarization. In this case, no active feedback control loop is needed.

There may be various example ways to generate such an optical signal. As one example, two laser sources that output optical signals having different polarizations may be combined together through a polarization beam combiner. As these two laser sources are decoupled from one another, the combined optical signals are not coherent with one another. As another example, the output of one laser may be split into two paths by a polarization beam splitter, propagate through two paths composed of a polarization maintaining fiber, and then later combined by a polarization beam combiner. If the length of one of the paths is greater than the coherence length of the laser, the combined output optical signal would have the portion having the X polarization non-coherent with the portion having the Y polarization.

These two examples require additional external components. For instance, in the first example technique to generate an optical signal having non-coherent X and Y polarizations, additional lasers are needed. In the second example technique to generate an optical signal having non-coherent X and Y polarizations, one additional laser and an extra optical link for the separate paths are needed.

As yet another example for generating an optical signal having non-coherent X and Y polarizations, pluggable optical module 10 may generate an optical output such that the portion having the X polarization is not coherent with the portion having the Y polarization in the combined optical signal. This optical signal may be fed back to pluggable optical module 10 for processor 24 to characterize the front end 18. In some cases, this optical signal that pluggable optical module 10 generates, where the portion having the X polarization is not coherent with the portion having the Y polarization, may be output to another optical module, and the processor of this other optical module may characterize the receiver front end of this other optical module using the received optical signal. One example advantage of this example is that no additional components are needed. All the components are readily implemented in pluggable optical module 10 for carrying real data traffic.

In general, pluggable optical module 10 receives a polarization-multiplexed optical signal that includes a first portion having a first polarization and a second portion having a second polarization. The first portion and the second portion are not coherent with one another (e.g., no fixed phase relationship) resulting in an effectively de-polarized optical signal where the power of the first portion is equal to the power of the second portion. Processor 24 determines characteristics of front end 18 based on the received polarization-multiplexed, de-polarized optical signal, and processor 24 may then use this information about front end 18 characteristics to enhance its compensation capability during normal operation.

The following describes examples where optical module 10 generates the optical signal where its portions with X and Y polarizations are not coherent, and the power is the same for each of the polarizations. For example, processor 24 may utilize the optical output of pluggable optical module 10 as the optical signal source for characterization. In order to generate an optical signal to be used for characterization at the output of the pluggable optical module 10, processor 24 may output a first electrical signal having a first frequency and a second electrical signal have a second, different frequency to pluggable optical module 10. The optical components within pluggable optical module 10 may modulate an optical signal with the first electrical signal and generate a first optical signal modulated at the first frequency and having a first polarization. The optical components within pluggable optical module 10 may modulate the optical signal with the second electrical signal and generate a second optical signal modulated at the second frequency and having a second polarization. An optical combiner within pluggable optical module 10 combines the first optical signal and the second optical signal to produce the desired optical output signal.

Accordingly, the optical signal that pluggable optical module 10 outputs includes both X polarization and Y polarization. The output of pluggable optical module 10 is fed back into the input of pluggable optical module 10 (e.g., via an internal optical switch if available). As also described in more detail below, if the coherent transmitter and coherent receiver 20 share the same laser, the output of another pluggable optical module may be fed into coherent receiver 20.

In both examples (e.g., feedback example or where optical input signal is sourced from another pluggable optical module), the optical signal that coherent receiver 20 receives should include equal powers in both the X-polarized component and the Y-polarized component and the X-polarized component and Y-polarized component should not be coherent. If the difference between the first frequency at which the first optical signal is modulated and the second frequency at which the second optical signal is modulated is less than a spectral width of the laser used in generating the optical input signal, then the determination of the characteristics of front end 18 may not be accurate because the SoP of input light in this case would be elliptically-polarized and hence may not be appropriate for use as an optical input signal for characterization.

In this case (e.g., where frequency difference is less than spectral width of the laser), the light in the X polarization is coherent with light in the Y polarization which means that they have fixed phase relationship. For example, if the phase difference between X and Y polarization is 90 degree, the combined output is circularly-polarized; if the phase difference is 0 degree, the combined output is linearly-polarized; for any other phase difference, the combined output is elliptically-polarized. The degree of polarization (DOP) of combined output in these cases would be close to i. Since a single mode fiber cannot maintain polarization state, there is no guarantee that polarization state at the input of the coherent receiver 20 is aligned to 45/135 degree linearly-polarized. Then there is no guarantee that equal amount of power is projected into X polarization and Y polarization.

Accordingly, in some examples, the absolute value of the difference between the first modulation frequency and the second modulation frequency may be greater than the spectral width of the laser. The spectral width of the laser in the frequency, measured by unit like Hz, is proportional to the laser linewidth in the wavelength domain, measured by unit like nm. The laser linewidth is the width of the optical spectrum of the laser that generated the optical signal. The laser linewidth indicates the spectral coherence of the laser. For instance, the laser should have only one wavelength. However, the laser generally includes a plurality of very close wavelengths. The more wavelengths in the laser means a larger linewidth, and fewer wavelengths in the optical signal means a smaller linewidth.

If the absolute value of the difference between the first frequency and the second frequency is greater than the spectral width, the output in the first polarization will not be coherent with the output in the second polarization. Because they are not coherent, there is no fixed phase relationship between the output in the first polarization and the output in the second polarization. Thus the combined output can be viewed as de-polarized optical signal, with its DOP close to zero. The advantage of this de-polarized output is that there is always equal amount of power in X polarization and Y polarization. Therefore, there is no need to have external components such as polarization controller 29, polarimeter 31, and controller 33, and hence a much simpler configuration can be achieved for characterization of the front end.

Although the above example describes the case where the coherent receiver 20, which includes pluggable optical module 10, receives the optical signal generated from the coherent transmitter, which includes the same pluggable optical module 10, the techniques described in this disclosure are not so limited. In some examples, pluggable optical module 10 may generate the optical signal by combining two optical signals that are modulated at different frequencies and have different polarizations. However, rather than outputting this optical signal to the coherent receiver 20, that includes pluggable optical module 10, pluggable optical module 10 may output the optical signal to a different pluggable optical module coupled to a different host board (e.g., a host board other than host board 28).

For instance, a server may include a plurality of host boards coupled to respective optical modules of which one is host board 28 coupled to pluggable optical module 10. In some cases, pluggable optical module 10 may transmit the optical signal to another optical module, and the processor of this other optical module uses the optical signal to determine the characteristics of the front end of the coherent receiver of this other optical module. In such examples, the coherent receiver 20 may also receive the optical signal from another pluggable optical module, where the optical signal is generated using the techniques described in this disclosure. Processor 24 may determine the characteristics of the front end using this optical signal that was generated by an optical module other than optical module 10.

As described in more detail below with respect to FIGS. 3A and 3B, photonics 12 includes a laser for the coherent transmitter and a laser for the coherent receiver 20. If the coherent transmitter and the coherent receiver 20 share the same laser, then rather than feeding back the optical signal that the coherent transmitter transmits to the coherent receiver 20 of the same pluggable optical module 10, the coherent transmitter of pluggable optical module 10 may transmit to another optical module on a different host board. In this case, the coherent receiver 20 may receive the optical signal from another pluggable optical module for processor 24 to determine the characteristics of the front end 18, where the other pluggable optical module generates the optical signal using the example techniques described in this disclosure. If the coherent transmitter and the coherent receiver 20 do not share the same laser (e.g., each have separate lasers), then the coherent receiver 20 may receive its own optical signal, generated using the techniques described in this disclosure, for processor 24 to determine the characteristics of the front end 18.

Figure 3A:
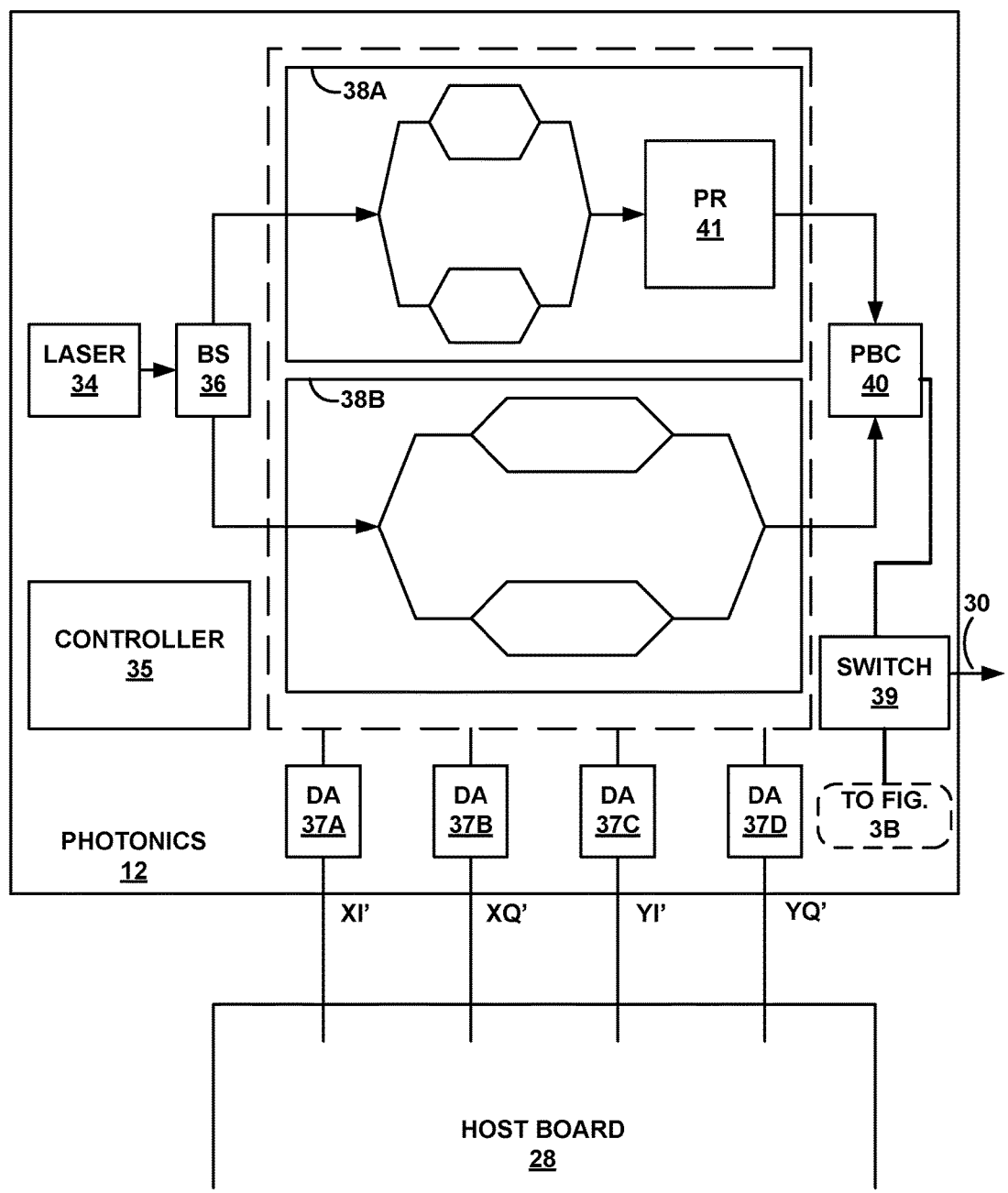
FIGS. 3A and 3B are block diagrams illustrating examples of photonics within a pluggable optical module.
Figure 3B:
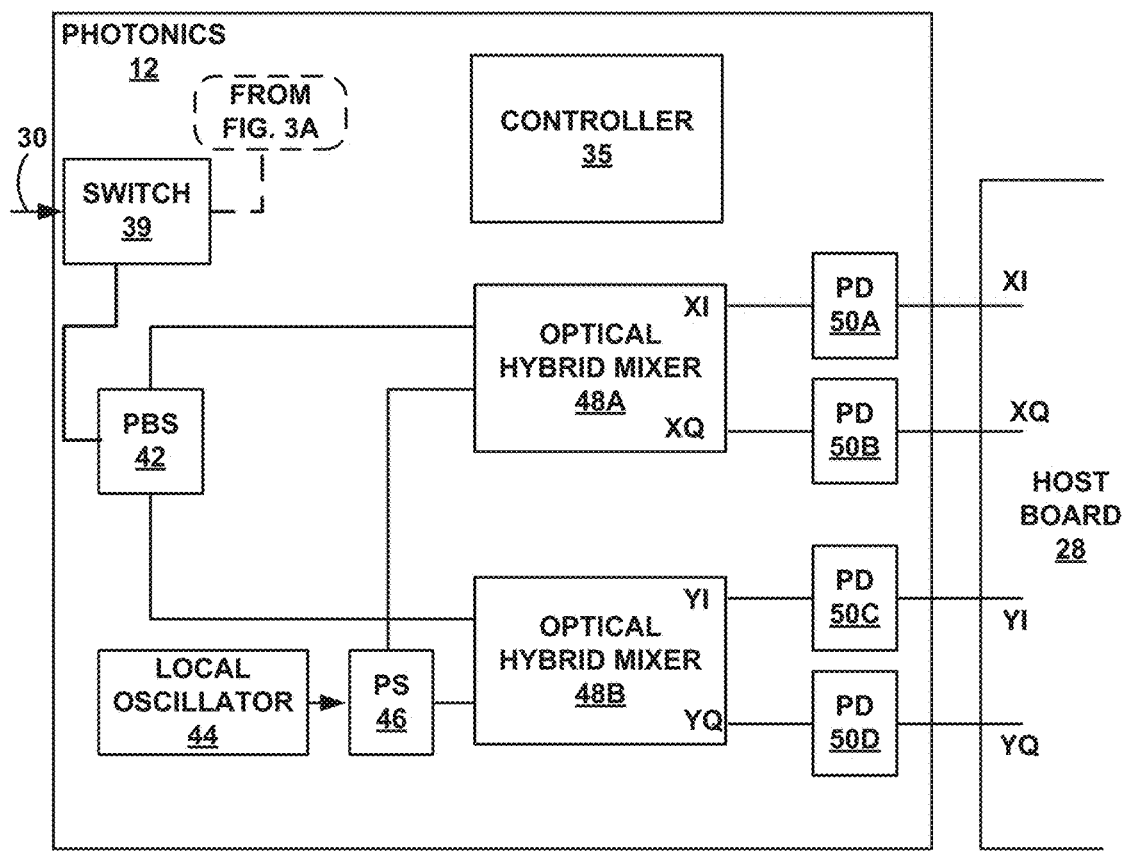

FIGS. 3A and 3B are block diagrams illustrating examples of photonics within a pluggable optical module. For example, FIG. 3A illustrates components of photonics 12 that receive I/Q electrical data streams from processor 24, convert the I/Q electrical data streams into a QAM modulated optical signal or PM-QAM modulated optical signal, and transmit the optical signal to network 32. FIG. 3A illustrates part of coherent transmitter. FIG. 3B illustrates components of photonics 12 that receive a QAM or PM-QAM optical signal from network 32, convert the optical signal into I/Q electrical data streams, and transmit the I/Q electrical data streams to processor 24. FIG. 3B illustrates part of coherent receiver 20. FIGS. 3A and 3B are illustrated separately for ease of description. However, it should be understood that photonics 12 includes both the transmit photonics illustrated in FIG. 3A and the receive photonics illustrated in FIG. 3B.

Furthermore, the components of photonics 12 are illustrated for PM-QAM modulation. Photonics 12 may include additional, fewer, or different components than those illustrated here without limiting the applicability of this disclosure. In alternate examples, photonics 12 may include different configurations to achieve PM-QAM modulation.

As illustrated in FIG. 3A, the transmit photonics of photonics 12 include laser 34, controller 35, beam splitter (BS) 36, drive amplifiers 37A-37D, optical modulators 38A and 38B, and polarization beam combiner (PBC) 40. Optical modulator 38A may also include polarization rotator (PR) 41, or PR 41 may be external to optical modulator 38A and coupled to the output of optical modulator 38A. PR 41 may be part of optical modulator 38B, or external to optical modulator 38B and coupled to the output of optical modulator 38B in other examples. PR 41 rotates the polarization of the optical signal generated by optical modulator 38A by 90°, and rotates the polarization of the optical signal generated by optical modulator 38B by 90° in examples where PR 41 is coupled to or part of optical modulator 38B. PBC 40 is coupled to optical link 30 and outputs an optical modulated signal (e.g., a PM-QAM modulated optical signal).

Also, as illustrated, photonics 12 receives XI', XQ', YI', and YQ' electrical data streams, which are electrical data streams outputted by processor 24 on host board 28 for PM-QAM modulation. In this disclosure, the terms XI', XQ', YI', and YQ' data streams are used to describe data streams that processor 24 transmits to pluggable optical module 10, and the terms XI, XQ, YI, and YQ electrical data streams are used to describe data streams that processor 24 receives from pluggable optical module 10. In normal operation, the XI', XQ', YI', and YQ' data streams that processor 24 transmits may be different from the XI, XQ, YI, and YQ data streams that processor 24 receives. For example, the XI', XQ', YI', and YQ' data streams are for downstream communication, while the XI, XQ, YI, and YQ data streams are for upstream communication.

In FIG. 3A, the XI' and XQ' data streams form a first pair of data streams that processor 24 transmits, and may be for an optical signal with polarization X. The YI' and YQ' data streams may form a second pair of data streams that processor 24 transmits, and may be for an optical signal with polarization Y. In some examples, the XI', XQ', YI', and YQ' data streams may be composed of differential data streams that are AC coupled via capacitors to photonics 12.

In FIG. 3A, the components of photonics 12 receive the XI', XQ', YI', and YQ' data streams from connection points 14, which mates with connection points 22 of host board 28. Photonics 12 include drive amplifiers 37A-37D coupled to each one of the XI', XQ', YI', and YQ' data streams. Drive amplifiers 37A-37D may amplify the voltage level of the XI', XQ', YI', and YQ' data streams outputted by host board 28.

Laser 34 may be any type of laser that is usable for high bit rate optical signal transmission, typically a narrow linewidth laser in the 1550 nm wavelength range (so-called C-Band), but can be tuned to any wavelength. Optical amplifiers operating in the same wavelength range may allow photonics 12 to transmit the generated optical signal (e.g., the combined optical signal with polarization X and the optical signal with polarization Y) a relatively far distance. An example is Erbium-Doped Fiber Amplifiers (EDFAs), which amplify light in the 1550 nm spectral region. The ability of photonics 12 to transmit the generated optical signal a relatively far distance reduces the number of intermittent optical-to-electrical-to-optical (O-E-O) repeaters needed to regenerate the transmitted optical signal.

Beam splitter (BS) 36 receives the light from laser 34 and splits the light into (at least) two paths. Each one of optical modulators 38A and 38B receives light from one of the paths. Optical modulators 38A and 38B modulate the light on the respective paths with respective I/Q electrical data stream pairs. Optical modulators 38A and 38B may be referred to as IQ modulators or Cartesian modulators. In the example of FIG. 3A, optical modulator 38A receives the XI' and XQ' electrical data streams and modulates the light received from laser 34 via BS 36 to form a complex modulated optical signal, modulated in both magnitude and phase, forming a QAM signal. Optical modulator 38B receives YI' and YQ' electrical data streams and modulates the light received from laser 34 via PS 36 to form a complex modulated optical signal, modulated in both magnitude and phase, forming a second QAM signal.

Polarization beam combiner (PBC) 40 receives the polarized and modulated optical signals from each one of optical modulator 38A and 38B. For instance, the optical QAM signals from optical modulators 38A or 38B are then multiplexed in (nominally orthogonal) polarization using PBC 40. For example, PBC 40 combines the received QAM optical signals into nominally orthogonal polarizations into a single polarization multiplexed (PM) optical signal having X polarization and Y polarization and transmits the PM-QAM optical signal to network 32 via optical link 30. In this manner, photonics 12 utilizes lightwave communications techniques to generate and transmit an optical PM-QAM signal.

As described above, in the techniques described in this disclosure, a coherent transmitter (e.g., as illustrated in FIG. 3A) generates the optical signal that processor 24 (or possibly some other device) uses to determine the characteristics of the front end 18, from which processor 24 (or possibly some other device) determines compensation parameters to compensate for the degradation in signal integrity caused by the front end 18 characteristics. In one example, processor 24 may output a first electrical signal having a first frequency and a second electrical signal having a second frequency. The first electrical signal refers generically to the combination of the XI' and XQ' electrical signals, and the second electrical signal refers generically to the combination of the YI' and YQ' electrical signals.

The difference between the first frequency and the second frequency may be greater than spectral width of laser 34. Also, although the XI' and XQ' electrical signals are described as having the first frequency and the YI' and YQ' electrical signals are described as having the second frequency, in other examples, the XI' and XQ' electrical signals may have the second frequency and the YI' and YQ' electrical signals may have the first frequency.

Optical modulators 38A and 38B modulate the lightwave generated by laser 34 based on the first and second electrical signals, respectively, to generate first and second optical signals, respectively. PR 41 causes the resulting first and second optical signals to have different polarization (e.g., the output of optical modulator 38A is X polarized, and the output of optical modulator 38B is Y polarized). PBC 40 combines the first and second optical signals to form a polarization-multiplexed optical signal.

The portion of coherent receiver 20 (e.g., as illustrated in FIG. 3B) may receive this polarization-multiplexed optical signal. For instance, photonics 12 includes controller 35 and switch 39. During normal operation (e.g., when not determining characteristics of the front end 18), the output of PBC 40 flows through switch 39 and out through optical link 30 for downstream transmission. For upstream reception, during normal operation, the optical signal flows through switch 39 to the portion of coherent receiver 20 illustrated in FIG. 3B. During characterization of the front end 18 (e.g., components illustrated in FIG. 3B and ADCs 19 within processor 24), processor 24 may output a command to controller 35 to instruct controller 35 to configure optical switch 39 to divert the optical output of PBC 40 to the optical input of the coherent receiver 20. Examples of controller 35 include, but are not limited to, a DSP, a general purpose microprocessor, an ASIC, a FPGA, a combination thereof, or other equivalent integrated or discrete logic circuitry.

As also described above, processor 24 need not necessarily determine the characteristics of the front end 18 based on an optical signal generated by the pluggable optical module 10. Rather, processor 24 may determine the characteristics of the front end 18 based on an optical signal generated by another optical module. In such cases, switch 39 may not be necessary as there is no feedback from the output of pluggable optical module 10 to the input of pluggable optical module 10.

There may be various examples of the first and second electrical signals that processor 24 outputs for determining the characteristics of the front end 18. As one example, the first and second electrical signals should have a narrowband frequency spectrum, rather than broadband signals. Also, the absolute value of the difference in the frequency of the first and second electrical signals should be greater than the spectral width of laser so that the resulting optical signals are not coherent with one another. For example, the optical signal that optical modulator 38A outputs and the optical signal that optical modulator 38B outputs should not be coherent with each other. In this case, the combined output from PBC 40 would have a DOP close to 0, as desired.

The DOP is the portion of the light which is polarized. If there is equal power for the X polarization and the Y polarization, and the light in X polarization is not coherent with (equivalently, does not have fixed phase relationship with) the light in Y polarization, then the DOP is approximately 0. If there is only power for the X polarization or only power for the Y polarization, then the DOP is approximately 1. Accordingly, the DOP value is between 0 and 1.

As an example, XI' and XQ' may be sinusoidal types of signals having a first frequency and YI' and YQ' may be sinusoidal types of signals having a second, different frequency, where the first frequency minus the second frequency is greater than the spectral width of laser 34 or the second frequency minus the first frequency is greater than the laser spectral width. Sinusoidal types of signals refer to examples of periodic signals having a narrowband frequency spectrum (e.g., few frequency components) rather than broadband (e.g., many frequency components). A sinusoidal signal (e.g., sine wave or cosine wave) generally includes only one frequency component, whereas a pseudo-random binary sequence (PRBS) signal includes broadband (e.g., many frequency components). The frequency components refer to the constituent frequencies that together form the signal. The sinusoidal type of signal need not necessary include only one frequency component, but is generally narrow band. For instance, the electrical signal for XI' and XQ' and YI' and YQ' may be periodic signals having a narrowband frequency spectrum. Use of a sinusoidal type of signal is provided as one example and should not be considered limiting.

Using sinusoidal types signals for XI' and XQ' and YI' and YQ' creates a frequency modulation for the light. Assume that the frequency of lightwave generated by laser 34 is Fc (i.e., the Fc is the carrier frequency of laser 34 which is a tunable laser source), the frequency of the X tributary channels (XI' and XQ') is fx, and the frequency of the Y tributary channels (YI' and YQ') is fy. Because XI' and XQ' are sinusoidal and modulate the lightwave generated by laser 34, the frequency of the first optical signal outputted by optical modulator 38A is Fc±fx, and the frequency of the second optical signal outputted by optical modulator 38B is Fc±fy. If the absolute value of ((Fc+fx)−(Fc+fy)) is greater than the laser spectral width of laser 34, the light from first optical signal (e.g., X-arm) and the light from the second optical signal (e.g., Y-arm) would not be coherent anymore. In this case, the combined output from PBC 40 may be considered as a polarization-multiplexed laser source with DOP close to zero (e.g., with de-polarized light).

As described above, sinusoidal type of signal is used as an example here. However the scope of modulating signal is not limited to sinusoidal type only. Any other suitable modulating signal, which generates the required frequency shift but does not broaden the linewidth of the light, can be used.

When modulating the lightwave generated by laser 34, one issue may arise with the automatic bias control (ABC) loop of optical modulators 38A and 38B. The ABC loop keeps the bias point of optical modulators 38A and 38B close to a null point to minimize power, and is generally designed to function for data patterns that are more random. When the data patterns (e.g., XI', XQ', YI', and YQ' electrical signals) are sinusoidal types of signals, the ABC loop may be unstable or converge to an incorrect bias point. Accordingly, in some examples, processor 24 may first output random data (e.g., a pseudo-random binary sequence (PRBS) signal) via the XI', XQ', YI', and YQ' to allow the ABC loop circuitry to determine a bias loop lock point of optical modulators 38A and 38B. Processor 24 may then lock the bias loop lock point of modulators 38A and 38B to the determined bias loop lock point, disable the ABC loop, and switch to the sinusoidal types of signals for XI', XQ', YI', and YQ'.

As described above, drive amplifiers 37A-37D amplify respective ones of the XI', XQ', YI', and YQ' electrical signals. If the amplification level is too high, the XI', XQ', YI', and YQ' electrical signals may be clipped, and the output of drive amplifiers 37A-37D would no longer be a sinusoidal wave, but instead a rectangular wave. In some examples, processor 24 may instruct controller 35 to configure drive amplifiers 37A-37D to operate in linear mode (e.g., as linear amplifiers, rather than limiting amplifiers). This way, the electrical signals that optical modulators 38A and 38B receive are sinusoidal types of signals to more precisely modulate the lightwave from laser 34.

As illustrated in FIG. 3B, the receive photonics of photonics 12 include polarization beam splitter (PBS) 42, local oscillator (LO) 44, polarization splitter (PS) 46, optical hybrid mixers 48A and 48B, and balanced photo-detectors (PDs) 50A-50D. It should be understood that there are actually eight photo-detectors forming four pairs of balanced photo-diodes. For simplicity, each pair is illustrated as one photo-detector. PDs 50A-50D convert the magnitude of the optical signal to an electrical representation. PBS 42 receives an optical signal from network 32 via optical link 30 and splits the received optical signal into first and second optical signals with nominally orthogonal polarization (e.g., substantially orthogonal polarization). Each one of optical hybrid mixers 48A and 48B receive respective optical signals from the first and second nominally orthogonal optical signals from PBS 42.

The receive photonics also include local oscillator 44, which is a laser. Local oscillator 44 provides the reference required in coherent system to recover the PM-QAM information imprinted in the waveform that photonics 12 receives. In some examples, local oscillator 44 may be a free running oscillator. For example, the laser signal outputted by local oscillator 44 may not need to be phase-locked with the optical signal that PBS 42 receives.

Polarization splitter (PS) 46 receives the light from local oscillator 44 and splits the light into (at least) first and second light paths. Each one of optical hybrid mixers 48A and 48B receive respective local oscillator light from the first and second light paths from the PS 46. In some examples, the location of PBS 42 and PS 46 may be swapped with no loss of functionality, provided the light from local oscillator 44 is split into two nominally orthogonally polarized lightwaves. Another approach is to use a beam splitter to replace PS 46, and add a polarization rotator in one of the arms (e.g., one of the channels).

Optical hybrid mixers 48A and 48B each mix the respective optical signals from PBS 42 with the respective local oscillator lightwave reference from PS 46 and output optical data stream representing in-phase (I) and quadrature-phase (Q) components of the PM-QAM modulated signal. For example, optical hybrid mixer 48A outputs XI and XQ optical data streams. Optical hybrid mixer 48B outputs YI and YQ optical data streams. In some examples, optical hybrid mixers 48A and 48B may be 90 degree optical hybrid mixers. Also, in some examples, each one of the XI, XQ, YI, and YQ optical data streams may be differentially encoded data streams.

Photo-detectors 50A-50D receive respective optical signals of the XI, XQ, YI, and YQ optical data streams and convert these optical signals into electrical signals (e.g., the XI, XQ, YI, and YQ data streams that processor 24 receives). As noted above, photo-detectors 50A-50D may be composed of a pair of nominally balanced photo-diodes. A transimpedence amplifier (TIA) element for each photo-detector may used to convert photo-current from the photo-diode(s) to a voltage representation. However, the inclusion of TIA elements may not be necessary in every example. The electrical output of each photo-detector in 50A-50D can be single-ended or differential electrical signals. In some examples, the TIA elements may include electrical amplifiers, or the electrical amplifiers may be external to the TIA elements.

There are two modes for the electrical amplifier: automatic gain control (AGC) and manual gain control (MGC). The AGC amplifiers may nominally maintain output electrical voltage amplitude/swing for varying input electrical current amplitude/swings by adjusting TIA gains. This mode is mostly used when the coherent receiver 20 is receiving the real time traffic. AGC mode may guarantee the electrical voltage amplitude/swing remains nearly constant when the input power to coherent receiver 20 varies due to optical line system. However, to characterize the front end 18 of coherent receiver 20, the manual gain control mode should be used. The reason is that during the frequency sweeping to determine the frequency response, the voltage swing will be reduced when the frequency difference is increased due to bandwidth, even with constant optical input power. In AGC mode, the amplifier will adjust TIA gain to make the voltage swing constant. In this case, the measurement result would not represent the true characteristics of front end 18 of coherent receiver 20. So controller 35 may switch the TIA to MGC mode during the characterization of coherent receiver 20, and then switch to AGC mode during the normal operation.

In this manner, the receive photonics of photonics 12 convert the PM-QAM modulated optical signal into electrical I and Q data stream pairs (e.g., the XI, XQ, YI, and YQ data streams) for further processing by processor 24 of host board 28. For example, processor 24 receives the XI, XQ, YI, and YQ electrical data stream pairs from photo-detectors 50A-50D through the mating between connection points 14 and connection points 22.

In the example techniques described in this disclosure, a coherent receiver 20 coupled to an electronic device (e.g., pluggable optical module 10 coupled to host board 28) receives a polarization-multiplexed optical signal that includes a first portion having a first polarization and a second portion having a second polarization, where the first portion and the second portion are not coherent with one another and the power of the first portion is equal to the power of the second portion. As an example, the polarization-multiplexed optical signal is generated from a first optical signal that is modulated at a first frequency and having a first polarization and a second optical signal that is modulated at a second, different frequency and having a second, different polarization. The degree of polarization of the polarization-multiplexed optical signal is approximately zero, indicating a de-polarized optical signal.

As one example, the coherent transmitter of pluggable optical module 10 generates the first and second optical signals. In this configuration, optical switch 39 conveys a feedback optical signal that feeds back the optical output of pluggable optical module 10 to the optical input of pluggable optical module 10. The feedback signal is transmitted through optical-to-electrical conversion via PBS 42, optical hybrid mixers 48A and 48B, and photo-detectors 50A-50D, back through connection points 14 and connection points 22 and ultimately to processor 24. In other examples, such as examples where laser 34 and local oscillator 44 share the same laser, the coherent receiver 20 receives the polarization-multiplexed optical signal from a coherent transmitter of a different electronic device.

Processor 24 may determine characteristics of a front end 18 of the electronic device based on the received polarization-multiplexed optical signal. The front end 18 of the electronic device includes pluggable optical module 10 and the ADCs of processor 24. Processor 24 may determine the frequency response, skew, and gain imbalance of the four tributary channels (e.g., XI, XQ, YI, and YQ). Processor 24 may then apply compensation to electrical signals received by processor 24 (e.g., as those outputted by front end 18) based on the determined characteristics.

As an example, to determine the frequency response, processor 24 may instruct controller 35 to change the frequency of local oscillator 44 (e.g., sweep the frequency of local oscillator 44 over a range of frequencies) such that local oscillator generates a plurality of optical signals having different frequencies. Optical hybrid mixers 48A and 48B may mix each one of the plurality of optical signals having different frequencies generated from local oscillator 44 with the received polarization-multiplexed optical signal to generate a plurality of electrical signals (e.g., XI, XQ, YI, and YQ electrical signals).

As described in more detail, for each frequency of the frequency sweep, processor 24 may determine a skew of an output of each ADC of the front end 18 (e.g., each ADC within processor 24), correct for the skew, and determine the frequency response and gain imbalance of the front end 18 based on the corrected skew. For example, for each frequency of the frequency sweep, a first skew measurement would indicate the time difference between the XI and XQ electrical signals, and a second skew measurement would indicate the time difference between the YI and YQ electrical signals. A first frequency response measurement would indicate the amplitude of the XI electrical signal for each frequency of the frequency sweep, a second frequency response measurement would indicate the amplitude of the XQ electrical signal for each frequency of the frequency sweep, a third frequency response measurement would indicate the amplitude of the YI electrical signal for each frequency of the frequency sweep, and a fourth frequency response measurement would indicate the amplitude of the YQ electrical signal for each frequency of the frequency sweep. The gain imbalance measurement may indicate the difference in the amplitude between the XI/XQ pair and the YI/YQ pair for each frequency in the frequency sweep.

As another example, rather than sweeping the frequency of local oscillator 44, the frequency of the carrier wave of the received polarization-multiplexed optical signal may have a changing optical carrier frequency. For instance, in the example where optical signal that PBC 40 outputs is fed back to PBS 42, processor 24 may instruct controller 35 to sweep the frequency of laser 34. In this example, the frequency (Fc) is what controller 34 is sweeping, and not the frequencies of the XI', XQ', YI', and YQ' electrical signals. In examples, where some other electronic device is generating the optical signal that pluggable optical module 10 receives, the coherent transmitter of this other electronic device may sweep the optical carrier frequency. In some examples, both the frequency of local oscillator 44 and optical carrier frequency of laser 34 (or the laser in the other electronic device) may change (e.g., increase frequency of local oscillator 44 by 0.5 GHz and reduce frequency of lightwave generated by laser 34 by 0.5 GHz for a 1 GHz change in frequency). In any of these examples, for each frequency of the frequency sweep, processor 24 may determine the skew, frequency response, and gain imbalance.

In some examples, to generate the polarization-multiplexed optical signal used to characterize the front end 18, a coherent transmitter (e.g., the portion of pluggable optical module 10 that receives analog electrical signals and outputs an optical signal) receives a first electrical signal having a first frequency (e.g., where first electrical signal refers to XI' and XQ' combined) and a second electrical signal having a second frequency (e.g., where second electrical signal refers to YI' and YQ' combined). The first electrical signal and the second electrical signal may be sinusoidal types of signals (e.g., periodic signals having a narrow frequency band such as a sine wave or cosine wave as two examples), although the techniques described in this disclosure are not so limited. The absolute value of the difference in the frequency of the first frequency and second frequency is greater than a spectral width of laser 34.

Optical modulator 38A modulates a lightwave from laser 34 with the first electrical signal to generate the first optical signal that is modulated at the first frequency, and optical modulator 38B modulates the lightwave from laser 34 with the second electrical signal to generate the second optical signal that is modulated at the second frequency. PBC 40 combines the two optical signals to generate the polarization-multiplexed optical signal and transmits the polarization-multiplexed optical signal.

In some examples, such as where laser 34 and local oscillator 44 share a common laser, an optical module, other than optical module 10, coupled to a host board, other than host board 28, may generate the polarization-multiplexed optical signals. In such examples, pluggable optical module 10 may still also generate a polarization-multiplexed optical signal, but for a coherent receiver of a different optical module.

Prior to transmitting the polarization-multiplexed optical signal used to characterize front end 18, processor 24 transmits with the coherent transmitter of pluggable optical module 10 a data optical signal (e.g., an optical signal that is not used for characterizing the front end 18). Processor 24 may determine a bias loop lock point for a bias loop for optical modulators 38A and 38B during the transmission of the data optical signal. Processor 24 may then set the bias loop at the determined bias loop lock point. In such examples, pluggable optical module 10 may output the polarization-multiplexed optical signal with the bias loop locked at the bias loop lock point.

FIGS. 4A-4D are graphical diagrams illustrating the quadrature versus in-phase outputs for a first polarization when a single laser, whose polarization is not controlled, is used as input. FIGS. 5A-5D are graphical diagrams illustrating the quadrature versus in-phase outputs for a second polarization when a single laser, whose polarization is not controlled, is used as input. FIGS. 4A-4D and FIGS. 5A-5D are taken simultaneously. The first polarization in FIGS. 4A-4D is orthogonal with the second polarization in FIGS. 5A-5D.

In FIGS. 4A-4D, the x-axis is the XI output of an ADC within processor 24 and the y-axis is the XQ output of an ADC within processor 24, and in FIGS. 5A-5D, the x-axis is the YI output of an ADC within processor 24, and the y-axis is the YQ output of an ADC within processor 24. The input for FIGS. 4A-4D and 5A-5D is an optical signal generated from a laser source, but not necessarily using the example techniques for generating the optical signal from a coherent transmitter as described above. The optical signal that the laser source outputs includes the X polarization and the Y polarization, but the X polarization and the Y polarization may be coherent with one another. Therefore, there is no guarantee that the optical signal that pluggable optical module 10 receives includes equal power in the X polarization and the Y polarization.

In an ideal system, graphs of XQ versus XI and YQ versus YI would appear as circles. In FIGS. 4A-4D, the graphs appear like circles, but in FIGS. 5A-5D, the graphs appear tilted. The reason for the tilt, in FIGS. 5A-5D, is due to skew as described in more detail below.

If the powers of the X-polarized component and of the Y-polarized component are the same, then in the ideal system, the resulting circles would also be of the same size. However, in each one of FIGS. 4A-4D and 5A-5D, the powers of the X-polarized component and the power of the Y-polarized component are not the same, and the amount by which the power in the X-polarized component differs from the power in the Y-polarized component is different for each one of FIGS. 4A-4D and 5A-5D.

Figure 4A:
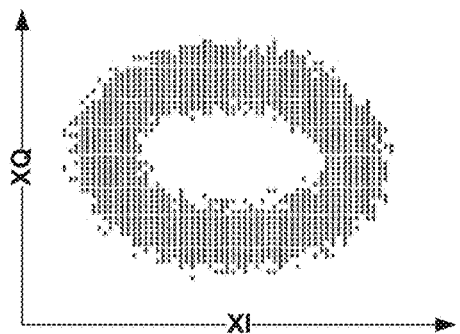
FIGS. 4A-4D are graphical diagrams illustrating the quadrature versus in-phase outputs for a first polarization when a single laser, whose polarization is not controlled, is used as input.
Figure 4B:
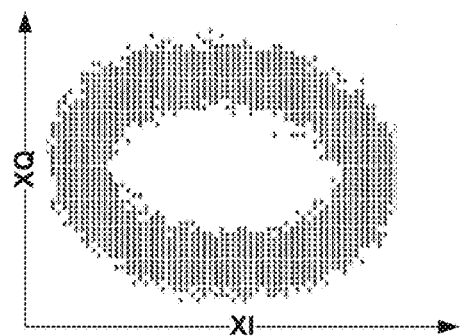
Figure 4C:
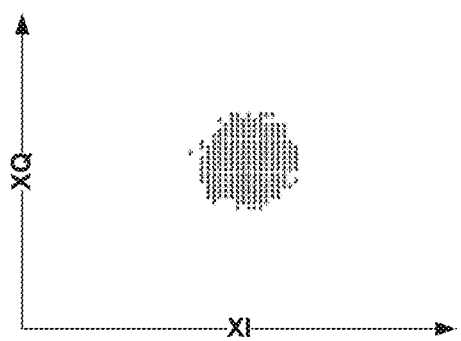
Figure 4D:
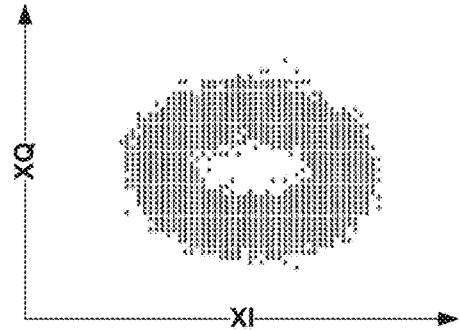
Figure 5A:
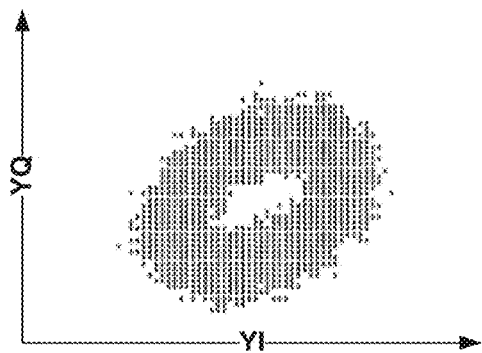
FIGS. 5A-5D are graphical diagrams illustrating the quadrature versus in-phase outputs for a second polarization when the same single laser, whose polarization is not controlled, is used as input.
Figure 5B:
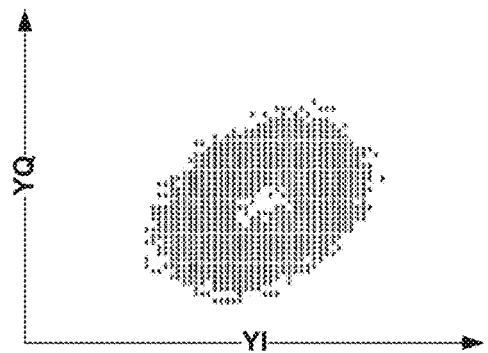
Figure 5C:
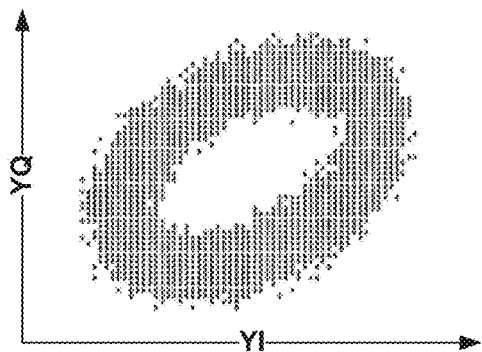
Figure 5D:
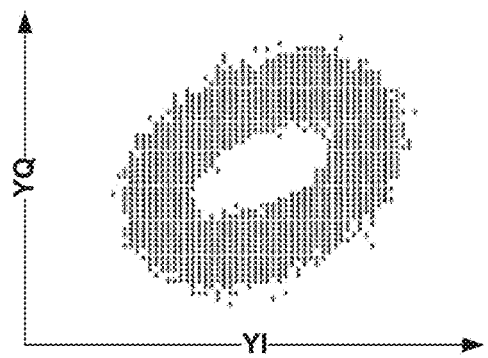

For instance, in FIG. 4C, the size of the circle is much smaller than the size of the circle in FIG. 4A. This may be because the amount of the power for the X polarization component of the received optical signal in FIG. 4C may be substantially less than the amount of power for the X polarization component of the received optical signal in FIG. 4A. In this case of FIG. 4C, processor 24 may determine the values of the XI and XQ electrical signals, and detect that the values of XI and XQ electrical signals is below a threshold, and conclude that there is severe signal integrity impairment in the processing of the X polarization component (e.g., severe signal integrity impairment along the X tributary channel). However, this is due to there being less optical power in the X polarization component, and not due to poor characteristics of the channel for the X polarization component.

With the techniques described in this disclosure, by ensuring that the X polarization component and Y polarization component are not coherent with one another, the power of the X polarization component and the power of the Y polarization component may be made approximately the same. Accordingly, the output of the ADCs of processor 24 may better represent the actual effects of the characteristics of the front end 18 (e.g., from the input of optical module 10 to the output of the ADCs of processor 24) on the resulting signal than the examples illustrated in FIGS. 4A-4D and FIGS. 5A-5D where the power of the X polarization component and the power of the Y polarization component may not be the same.

Figure 6:
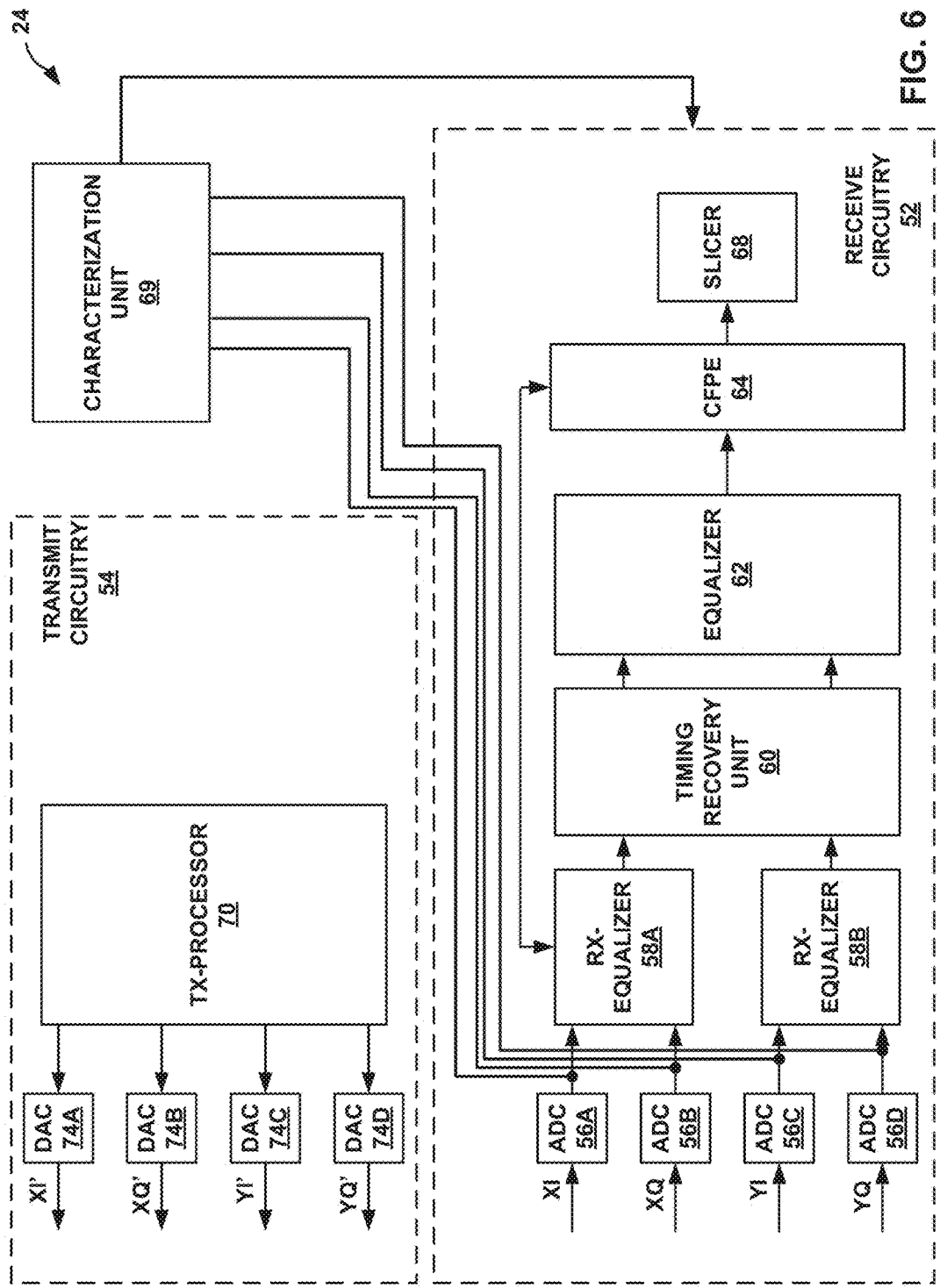
FIG. 6 is a block diagram illustrating an example of a processor of FIG. 1 in further detail.

FIG. 6 is a block diagram illustrating an example of processor 24 of FIG. 1 in further detail. In general, FIG. 6 illustrates a set of exemplary functional blocks implemented by processor 24. Processor 24 may be a digital signal processor (DSP), ASIC having specialized operations, a general purpose processor or similar execution unit or integrated circuit or electronic system capable of implementing the operations described herein. For example, the components of processor 24 illustrated in FIG. 6 may comprise instructions executable from a memory, microcode, hardware-based logic functions or combinations thereof. In general, based on the described operations, processor 24 may be referred to as a modulator-demodulator (modem).

In the illustrated example, processor 24 includes receive circuitry 52 and transmit circuitry 54. For example, receive circuitry 52 includes electronic components for reception of the electrical signal across connection points 14 and connection points 22 from photonics 12. Receive circuitry 52 forms part of receiver 20. Transmit circuitry 54 includes electric components for transmission of the electrical signal across connection points 22 and connection points 14 to photonics 12.

Processor 24 also includes characterization unit 69. Characterization unit 69 may be hardware of processor 24 or software or firmware executing on processor 24. Characterization unit 69 may be configured to determine the characteristics of the front end 18 in accordance with one or more example techniques described in this disclosure, and may also be configured to apply the compensation to compensate for the effects of the characteristics of the front end 18.

Receive circuitry 52, which is part of receiver 20, includes analog-to-digital converters (ADCs) 56A-56D (similar to ADCs 19 of FIG. 1), receiver (RX)-equalizers 58A and 58B, timing recovery unit 60, equalizer 62, carrier frequency and phase estimation (CFPE) unit 64, and slicer 68. The output of slicer 68 may be a relatively high data rate electrical data stream. Components such as a training deframer may receive the output of slicer 68. A forward-error correction (FEC) decoder, if FEC is utilized, may receive the output of the training deframer and may decode the electrical data stream for further transmission downstream (e.g., to the one or more switches and routers after deserialization). The training deframer and FEC decoder may be part of processor 24, or external to processor 24 and are not illustrated for purposes of clarity.

ADCs 56A-56D are input units of processor 24 that receive data streams via pluggable interface 13 and pluggable interface 21. For example, each of ADCs 56A-56D receive one of the analog XI, XQ, YI, and YQ electrical data streams from pluggable optical module 10 via pluggable interface 13 and pluggable interface 21, and convert the analog data streams into digital data streams. In some examples, ADCs 56A-56D include a local memory that stores the result of the analog-to-digital conversion. Characterization unit 69 receives the outputs of ADCs 56A-56D via the local memory or may directly receive the outputs of ADCs 56A-56D, in addition to RX-equalizer 58A and 58B receiving the outputs. Characterization unit 69 may use the outputs of ADCs 56A-56D for determining the characteristics of the front end 18.

RX-equalizer 58A receives one pair of the I/Q digitized data streams (i.e., XI and XQ data streams), and RX-equalizer 58B receives another pair of the I/Q data streams (i.e., YI and YQ data streams). RX-equalizer 58A and RX-equalizer 58B can be considered as a filter that can compensate for front end 18 imperfections and certain optical distortions on the pairs of the I/Q digitized data streams. Front end 18 imperfections may include impairments such as I/Q gain imbalances, I/Q non-orthogonality, I/Q offset, etc. A common example of optical distortion tackled by RX-equalizer 58A and RX-equalizer 58B may be chromatic dispersion.

In some examples, RX-equalizer 58A and RX-equalizer 58B may be formed in single 2×2 complex multiple-input-multiple-output (MIMO) equalizer, such as the equalizer 62 in receive circuitry 52. This 2×2 complex RX-equalizer may compensate for the distortion on at least two pair of the received data streams simultaneously. In some instances, such a common RX-equalizer may be a relatively large equalizer that consumes most of the real estate available on processor 24, as compared to two 1×1 complex equalizers (i.e., RX-equalizer 58A and RX-equalizer 58B). For real estate management, processor 24 may include RX-equalizer 58A and RX-equalizer 58B, in addition to a smaller 2×2 complex equalizer 62, as illustrated in FIG. 6.

Timing recovery unit 60 receives data streams from RX-equalizer 58A and RX-equalizer 58B and performs timing recovery. For example, timing recovery unit 30 performs symbol timing utilizing interpolation and Timing Error Detector (TED) to achieve symbol timing recovery, although other timing recovery techniques are possible. One example of the timing recovery technique is described in F. M. Gardner, "BPSK/QPSK Timing-Error Detector for Sampled Receivers," IEEE Transactions on Communications, vol. COM-34, No. 5, May 1986, and is incorporated by reference in its entirety. The sampling frequency locked clock, generated by timing recovery unit 60, may provide the clock signal for components of processor 24 or for other components on host board 28.

Equalizer 62 receives the data streams from timing recovery unit 60 and performs any other compensations. For example, RX-equalizer 58A and RX-equalizer 58B may not be able to compensate for all of the chromatic dispersion, and equalizer 62 may compensate for any remaining chromatic dispersion. In addition, equalizer 62 may un-mix the polarization of the received data streams. For example, equalizer 62 may compensate for any polarization mixing in optical link 30 (e.g., mixing between the lightwave with polarization X and the lightwave with polarization Y). Furthermore, equalizer 62 may perform some compensation for the distortion induced by pluggable interface 13 and pluggable interface 21.

Carrier frequency and phase estimation unit (CFPE) 64 corrects for the phase and the frequency offset that may be present in the data stream. For example, as described above with respect to FIG. 3B, local oscillator 44 may be a free-running oscillator. Because local oscillator 44 may be a free-running oscillator, the XI and XQ data streams may be orthogonal to one another, and the YI and YQ data streams may be orthogonal to one another; however, the phases of each of these data streams may not be fixed and there may exist a frequency offset between the carrier frequency of the received lightwave and that of the local oscillator. CFPE 64 may function in feedback or feed-forward modes to estimate and compensate for the frequency and phase offsets of the received data streams. Slicer 68 receives the data streams from CFPE 64. It may convert the estimated constellation symbols at the output of CFPE 64 to binary sequences or pass the symbol estimates as I/Q pairs depending on the implementation for further processing within processor 24 or other components on host board 28.

As illustrated in FIG. 6, transmit circuitry 54 includes transmitter (TX) processor 70, an example of which is a TX-digital signal processor (DSP). Transmit circuitry 54 also includes digital-to-analog converters (DACs) 74A-74D. DACs 74A-74D receive digital pairs of XI', XQ', YI', and YQ' data streams from TX processor 70 and convert the digital data streams into analog data streams for transmission to pluggable optical module 10. In FIG. 6, DACs 74A-74D are output units of processor 24 that transmit data streams to photonics 12 via pluggable interface 21 and pluggable interface 13. TX processor 70 may receive a forward-error correction (FEC) encoded data stream, which might have framing applied to it prior to FEC, from other components within processor 24 or other components on host board 28. TX processor 70 may perform its own training symbol insertion, map the received encoded data stream to the symbols for the desired modulation, and apply spectral shaping and various other electrical and/or optical pre-compensation functions, where the latter optical pre-compensation, in general, refers to pre-compensation of optical linear/non-linear impairments that may be present in network 32. For example, TX processor 70 may convert the encoded data stream to the symbols for PM-QAM modulation with desired spectral properties to generate the pairs of I' and Q' data streams.

In the example techniques described in this disclosure, one way to generate the sinusoidal XI', XQ', YI', and YQ' electrical signals is to have transmit circuitry 54, via TX-processor 70, generate the digital electrical signals that convert into analog signals when outputted by DACs 74A-74D. Another way to generate the sinusoidal XI', XQ', YI', and YQ' electrical signals is to embed the sinusoidal data pattern in a local memory of DACs 74A-74D.

Transmit circuitry 54 may output the XI', XQ', YI', and YQ' electrical signals that represent normal data (e.g., data that is converted into a data optical signal and transmitted to network 32). Characterization unit 69 may determine that the front end 18 (e.g., optical module 10 and ADCs 56A-56D) of the coherent receiver 20 is to be characterized. For instance, characterization unit 69 may determine that the front end 18 is to be characterized in response to an external command, on a periodic basis, in response to a new pluggable optical module being inserted, or some other trigger.

In response, characterization unit 69 may determine the bias loop lock point during transmission of the data signal, and may lock the bias loop at the bias loop lock point. The bias loop lock point is the bias level of the bias loop during the transmission of the data signal.

Characterization unit 69 may then cause DACs 74A-74D to output respective sinusoidal electrical signals as the XI', XQ', YI', and YQ' electrical signals. In this example, the XI' and XQ' electrical signals have a first frequency and the YI' and YQ' electrical signals have a second, different frequency. Optical modulators 38A and 38B receive respective ones of the XI' and XQ' electrical signals and YI' and YQ' electrical signals and modulate a lightwave from laser 34 to generate a first optical signal that is modulated at a first frequency and having a first polarization and a second optical signal that is modulated at a second frequency and having a second polarization. PBC 40 combines the first and second optical signals to generate a polarization-multiplexed optical signal and transmits this polarization-multiplexed optical signal.

In some examples, switch 39 may feedback the polarization-multiplexed optical signal that PBC 40 outputs to coherent receiver 20. In some examples, PBC 40 may transmit the polarization-multiplexed optical signal to a different optical module.

During characterization, PBS 42 receives the polarization-multiplexed optical signal from PBC 40, or receives the polarization-multiplexed optical signal from a different optical module that generated the polarization-multiplexed optical signal in a manner similar to that described above. In either example, PBS 42 receives a polarization-multiplexed optical signal that is generated from a first optical signal that is modulated at a first frequency and having a first polarization and a second optical signal that is modulated at a second, different frequency and having a second, different polarization. Optical hybrid mixers 48A and 48B mix the received polarization-multiplexed optical signal with the optical signal from local oscillator 44 to generate the XI, XQ, YI, and YQ electrical signals that ADCs 56A-56D receive.

Characterization unit 69 may receive a "snapshot" of the output of ADCs 56A-56D. For instance, the frequency of local oscillator 44 may be at a first frequency, and while the frequency of local oscillator 44 is at the first frequency, optical hybrid mixers 48A and 48B may continuously generate analog electrical signals XI, XQ, YI, and YQ that are converted to digital electrical signals via ADCs 56A-56D. Characterization unit 69 may read the resulting digital electrical signals during when local oscillator 44 is at the first frequency. From the read digital electrical signals, characterization unit 69 may determine the characteristics of the front end 18 (e.g., skew, frequency response, and gain imbalance) at the first frequency.

Processor 24 may then instruct controller 35 to adjust the frequency of local oscillator 44 to a second frequency. While the frequency of local oscillator 44 is at the second frequency, optical hybrid mixers 48A and 48B may continuously generate analog electrical signals XI, XQ, YI, and YQ that are converted to digital electrical signals via ADCs 56A-56D. Characterization unit 69 may read the resulting digital electrical signals during when local oscillator 44 is at the second frequency. From the read digital electrical signals, characterization unit 69 may determine the characteristics of the front end 18 (e.g., skew, frequency response, and gain imbalance) at the second frequency. Processor 24 and characterization unit 69 may repeat these steps for all frequencies that are to be swept (e.g., local oscillator frequencies that result in baseband frequencies (i.e., the difference between the local oscillator and laser frequency) between 0 Hz to 25 GHz). In this way, characterization unit 69 determines the characteristics of the front end 18.

In some examples, rather than changing the frequency of local oscillator 44, the optical carrier frequency of the polarization-multiplexed input optical signal may be changing. For example, in the case where the polarization-multiplexed optical signal generated by pluggable optical module 10 is fed back into PBS 42, laser 34 may output its lightwave at a first frequency. While laser 34 is outputting lightwave at the first frequency, the optical carrier frequency of the polarization-multiplexed optical signal is at the first carrier frequency (e.g., Fc equals the first frequency). While the frequency of the polarization-multiplexed optical signal is at the first frequency, optical hybrid mixers 48A and 48B may continuously generate analog electrical signals XI, XQ, YI, and YQ that are converted to digital electrical signals via ADCs 56A-56D. Characterization unit 69 may read the resulting digital electrical signals during when the optical carrier frequency of the polarization-multiplexed optical signal is at the first carrier frequency. From the read digital electrical signals, characterization unit 69 may determine the characteristics of the front end 18 (e.g., skew, frequency response, and gain imbalance) at the first frequency.

Processor 24 may then instruct controller 35 to adjust the frequency of the lightwave that laser 34 outputs to a second carrier frequency. While laser 34 is outputting lightwave at the second frequency, the optical carrier frequency of the polarization-multiplexed optical signal is at the second frequency (e.g., Fc equals the second frequency). While the frequency of the polarization-multiplexed optical signal is at the second frequency, optical hybrid mixers 48A and 48B may continuously generate analog electrical signals XI, XQ, YI, and YQ that are converted to digital electrical signals via ADCs 56A-56D. Characterization unit 69 may read the resulting digital electrical signals during when the optical carrier frequency of the polarized multiplexed optical signal is at the second frequency. From the read digital electrical signals, characterization unit 69 may determine the characteristics of the front end 18 (e.g., skew, frequency response, and gain imbalance) at the second frequency. Processor 24 and characterization unit 69 may repeat these steps for all frequencies that are to be swept (e.g., laser frequencies that result in baseband frequencies (i.e., the difference between the local oscillator and laser frequency) between 0 Hz to 25

GHz). In this way, characterization unit 69 determines the characteristics of the front end 18.

In examples where the polarization-multiplexed optical signal is generated by a different optical module, the optical carrier frequency may change at set time intervals so that characterization unit 69 can determine the optical carrier frequency at the time the digital electrical signals are read. As another example, processor 24 may instruct this other optical module (e.g., via backend communication techniques) to change the optical carrier frequency. Also, in some examples, processor 24 may cause both the carrier frequency of laser 34 to change and for the frequency of local oscillator 44 to change. For instance, to adjust the frequency for characterization (i.e. the baseband frequency resulting from the difference between the carrier frequency of the laser and the frequency of the local oscillator), processor 24 may cause local oscillator 44 to reduce its frequency by 0.5 GHz and cause laser 34 to increase its frequency by 0.5 GHz for a total effective frequency change of 1 GHz on the baseband frequency used in characterization.

After characterization unit 69 determines the characteristics of the front end 18, during normal operation where the coherent receiver 20 is receiving optical data from network 32, characterization unit 69 may apply compensation to electrical signals received by processor 18 (e.g., as outputted by front end 18) based on the determined characteristics to address the impact on the electrical signals caused by the characteristics of the front end 18. In this way, the electronic device that includes pluggable optical module 10 and host board 28 may function better compared to others because the signal that receive circuitry 52 outputs is of better quality resulting in fewer bit errors. In some cases, instead of performing compensation itself, characterization unit 69 passes the front end 18 characterization information to the processor 24 to be used within the one or more equalizers readily present on the receive digital signal processing chain of processor 24 or as an additional equalizer to help improve the received signal fidelity and hence the bit error ratio.

As one example, characterization unit 69 may determine the skew between XI/XQ or YI/YQ pairs. In some cases, the output from ADC 56A may lag the output from ADC 56B, or vice-versa, and the same may occur for ADCs 56C and 56D. The skew is a measure of this lag. If characterization unit 69 determines that the output from ADC 56A lags the output from ADC 56B by a few pico-seconds, characterization unit 69 may add delay to the input of RX-equalizer 58B that receives the output from ADC 56B to compensate for the skew.

As another example, characterization unit 69 may determine that the amplitudes of the outputs of ADCs 56A and 56B is greater than the amplitudes of the outputs of ADCs 56C and 56D (e.g., there is gain imbalance). In this case, characterization unit 69 may determine that the amplitude gain that ADCs 56C and 56D may apply should be increased so that the amplitudes of the electrical signals are approximately the same. Characterization unit 69 may perform similar functions if determined that the amplitude of ADC 56A is greater than ADC 56B, or vice-versa, or if determined that the amplitude of ADC 56C is greater than ADC 56D, or vice-versa. For instance, characterization unit 69 may inform processor 24 to increase the amplitude gain of respective ones of ADCs 56A-56D to address the gain imbalance.

When transmit circuitry 54 carries real data traffic, coherent receiver 20 (e.g., receive path through pluggable optical module 10) works in AGC mode (e.g., the transimpedance amplifiers are in AGC mode), where gain imbalance is compensated. However, processor 24 may determine the gain imbalance in manual gain control mode, so that the gain imbalance is not compensated. Determining the gain imbalance is an important quality indicator of coherent receiver 20. Any large gain imbalance will indicate either that there is issue in optical domain before balanced photo diode, or there is issue in electrical domain after balanced photo diode.

There may be various ways in which characterization unit 69 may determine the characteristics of the front end 18 based on the output of ADCs 56A-56D, and the following is one example technique. The techniques described in this disclosure should not be considered limited to the following technique, and other techniques to determine the characteristics of the front end 18 are possible.

The skew of an XI/XQ pair or YI/YQ pair causes the circle representation to tilt, as illustrated in FIGS. 5A-5D. Characterization unit 69 may construct a graph similar to those illustrated in FIGS. 4A-4D and 5A-5D, and determine an angle of the tilt (e.g., angle of rotation). Based on the angle of the tilt and the frequency of the polarization-multiplexed input signal or frequency of local oscillator 44 (or a combination of the two), characterization unit 69 may determine the skew. For example, to determine the characteristics, characterization unit 69 may determine a skew of an output of ADCs 56A-56D of the front end 18 based on the received polarization-multiplexed optical signal. Characterization unit 69 may correct the skew based on the output of ADCs 56A-56D, and determine one or more of a frequency response and gain imbalance of the coherent receiver 20 based on the output of ADCs 56A-56D with the skew correction.

Figure 7A:
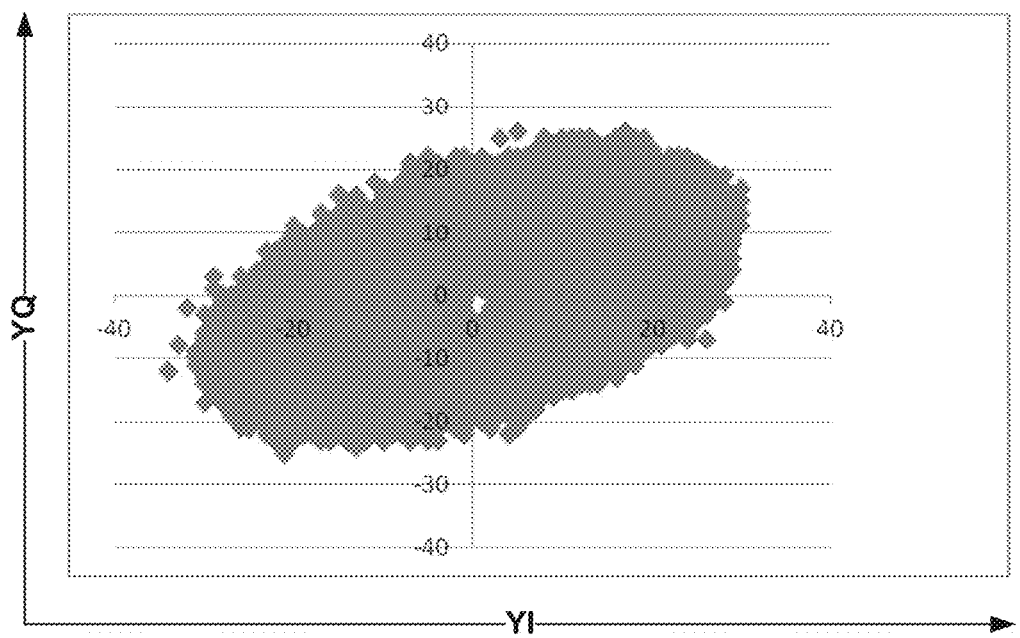
FIGS. 7A and 7B are graphical diagrams illustrating another example of quadrature versus in-phase outputs.
Figure 7B:
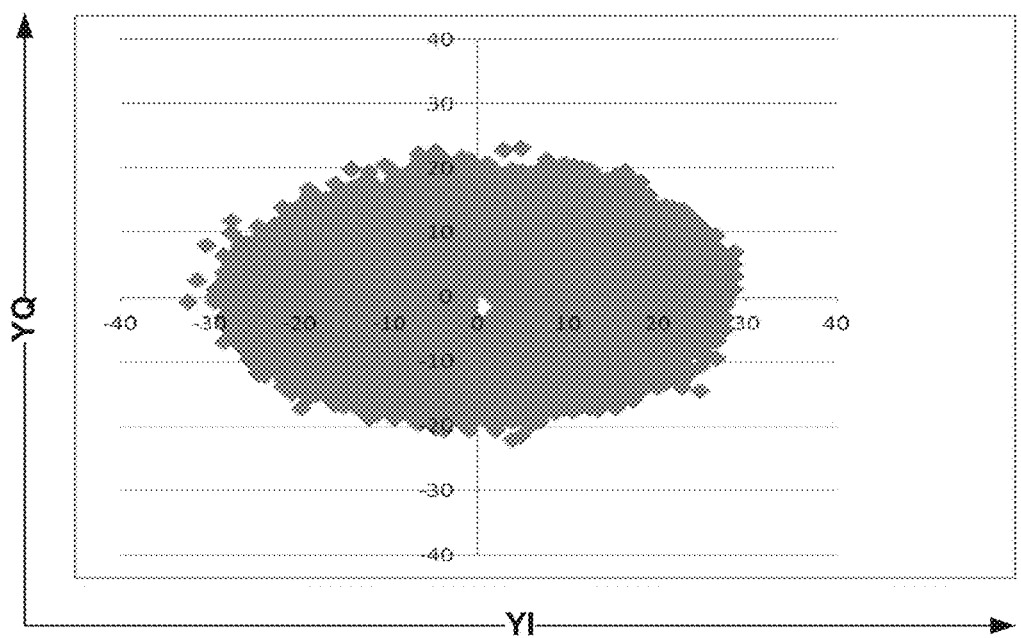

FIGS. 7A and 7B are graphical diagrams illustrating another example of quadrature versus in-phase outputs. As illustrated in FIG. 7A, there is a tilt in the graph generated from YQ versus YI. This tilt may be caused by the YQ signal arriving faster than the YI signal or vice versa, and represents the skew between YQ and YI. Also noticeable, the external boundary of YQ vs YI is roughly an ellipse. Characterization unit 69 may determine that the angle of the major axis of the ellipse is 19°. From this angle of tilt, characterization unit 69 may determine the skew. For example, assume that the baseband frequency resulting from the difference between the carrier frequency of the input signal and the frequency of the local oscillator is 22.5 GHz. In this example, the period is 44.44 ps (1/22.5 GHz). To determine the skew, characterization unit 69 may apply the following equation: 44.44 ps*(19°/360°). Based on this equation, characterization unit 69 may determine that the skew is approximately 2.3 ps. FIG. 7B illustrates the same graph as FIG. 7A, but with the tilt removed (e.g., FIG. 7B is generated by rotating FIG. 7A by 19°).

To determine the frequency response, characterization unit 69 removes the skew from the time domain signal (e.g., time domain representation of the values represented by the digital signal outputted by ADCs 56A-56D). For instance, if there is a skew between YI and YQ, characterization unit 69 may adjust the output of YI or YQ by the determined amount of skew, and determine the frequency response after the skew is removed. Characterization unit 69 may perform a fast Fourier transform (FFT) on the sequence of values represented by the digital signal outputted by ADCs 56A-56D to determine the frequency response.

Figure 8A:
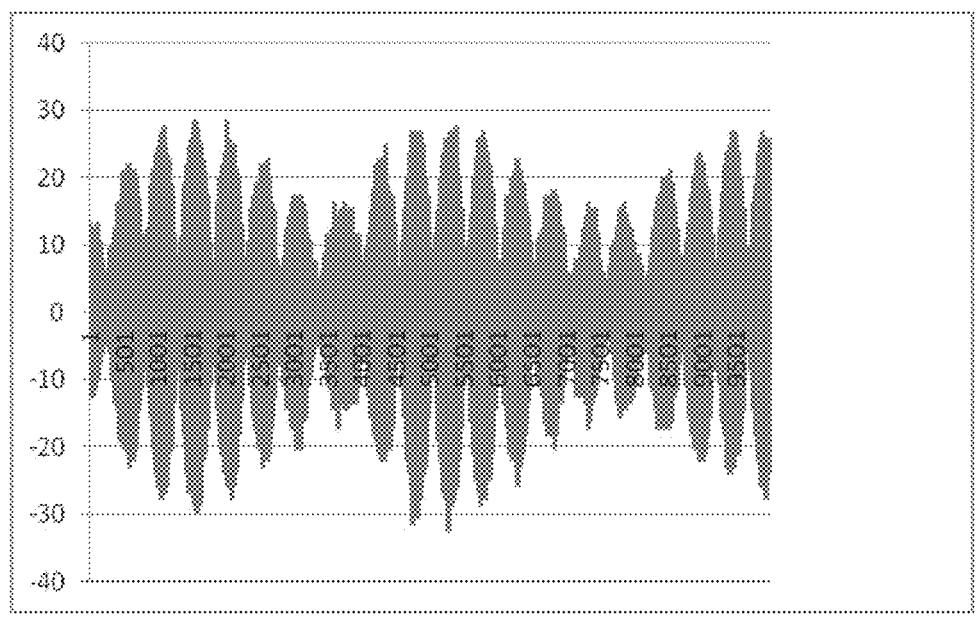
FIGS. 8A and 8B are graphical diagrams illustrating a time domain signal used for determining characteristics of a front end.
Figure 8B:
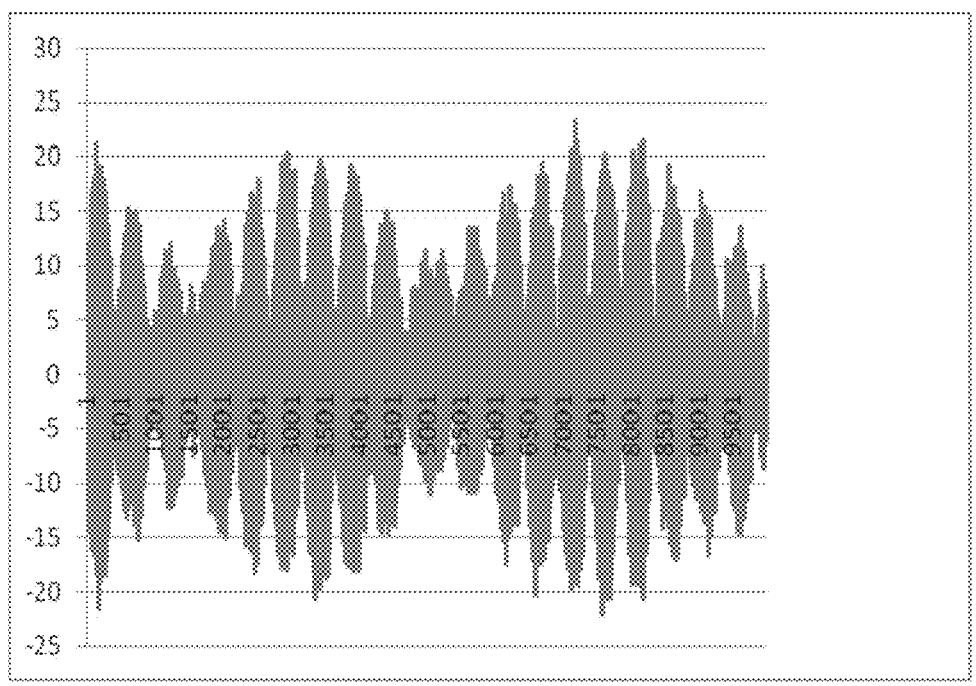

FIGS. 8A and 8B are graphical diagrams illustrating a time domain signal used for determining characteristics of front end 18. For example, FIG. 8A illustrates the values of the YI signal represented by the digital signal that ADC 56C outputs. FIG. 8B illustrates the values of the YI signal represented by the digital signal that ADC 56C outputs with the skew removed (e.g., shifted by approximately 2.3 ps). As seen, before removing the skew, characterization unit 69 may determine that the peak-to-peak swing is ~60 auxiliary units (a.u.); however, after removing the skew, the characterization unit will accurately determine that the peak-peak swing is ~55 a.u. Another way to view this is as follows: before removing skew, characterization unit 69 may determine the peak-to-peak swing of YI/YQ tributaries along the YI and YQ axes in FIG. 7A. However the actual peak-to-peak swing of YI/YQ tributaries should be determined along the major/minor axis of ellipse in FIG. 7A, which are peak-to-peak swings in the YI and YQ axes in FIG. 7B (with skew being removed). This will represent the true frequency response of particular tributary. In addition, characterization unit 69 may perform the FFT on the sequence of values present in FIG. 8B to accurately determine the actual baseband frequency. During the frequency sweep, the actual baseband frequencies, i.e., the actual frequency differences between the transmitter laser and the receiver laser may be different from the value used by host board 28. Characterization unit 69 may perform an FFT on the time domain signal after the skew is removed to determine the actual baseband frequency. Indeed, the peak value of the FFT spectrum will correspond to the actual baseband frequency. In this way, processor 24 may determine a more accurate frequency response. As described above, controller 35 may then sweep through the frequencies for the frequency response measurement, and for each frequency, characterization unit 69 may perform the example techniques described with respect to FIGS. 7A, 7B, 8A, and 8B to determine skew and frequency response.

Figure 9:
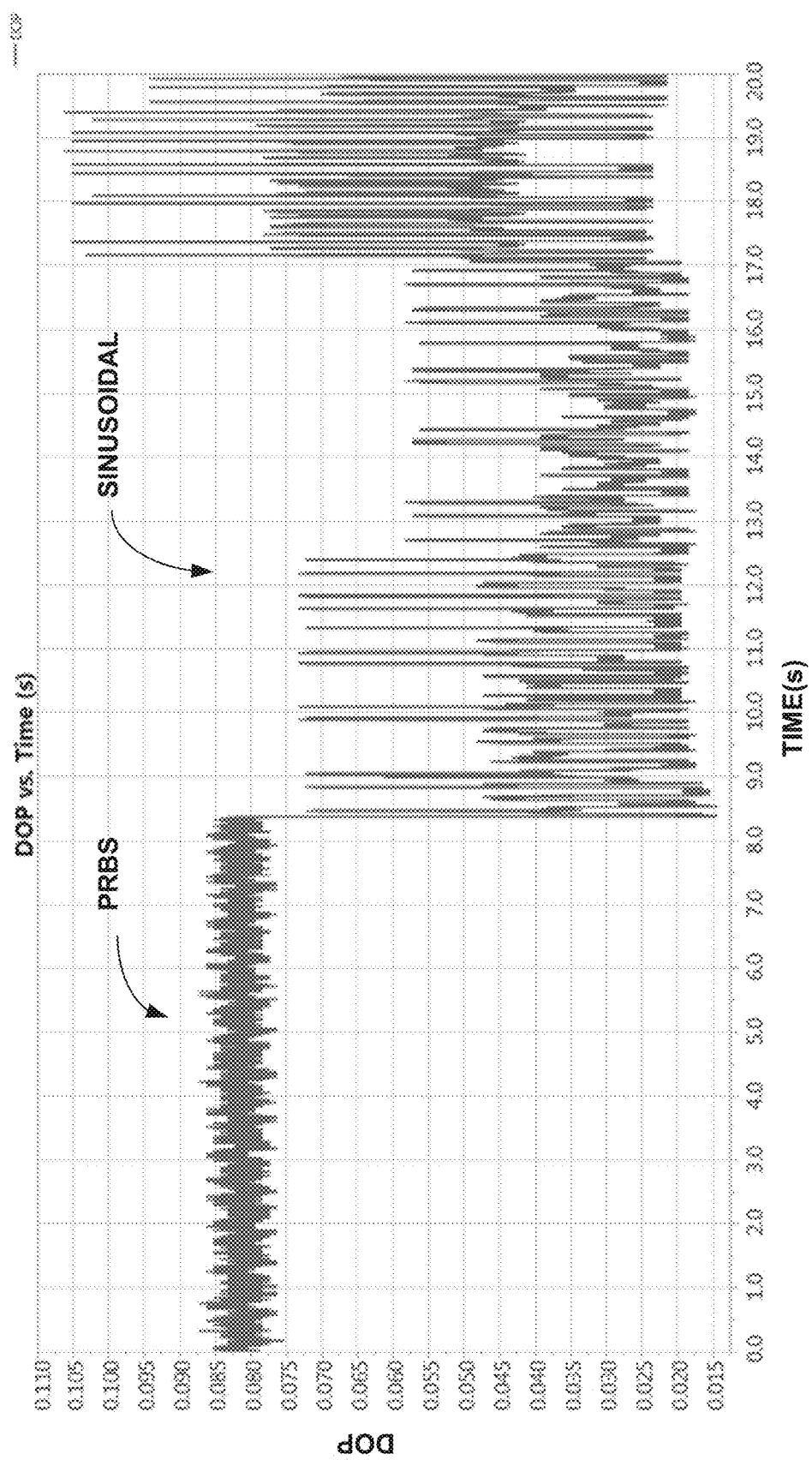
FIG. 9 is a graphical diagram illustrating a degree of polarization (DOP) for an optical signal generated from modulating with a pseudo-random binary sequence (PRBS) signal followed by a sinusoidal signal with bias loop active.

FIG. 9 is a graphical diagram illustrating a degree of polarization (DOP) for an optical signal generated from modulating with a pseudo-random binary sequence (PRBS) signal followed by a sinusoidal signal while the bias loop is active. In the example illustrated in FIG. 9, optical modulators 38A and 38B receive PRBS signals for electrical signals XI', XQ', YI', and YQ' and modulate the lightwave outputted by laser 34. As illustrated, the DOP is approximately 0.072, which may be due to power imbalance between the X-arm and the Y-arm. Then, optical modulators 38A and 38B receive sinusoidal types of signals (e.g., periodic signals having narrowband frequency spectrum) for electrical signals XI', XQ', YI', and YQ' and modulate the lightwave outputted by laser 34. In this example, the frequency of the XI' and XQ' electrical signals is 0.5 GHz, and the frequency of the YI' and YQ' electrical signals is 1.5 GHz. As illustrated, the DOP fluctuates wildly. This may be because the bias loop is unable to function properly causing the power of X-arm and Y-arm to fluctuate, resulting in changing DOP.

Figure 10:
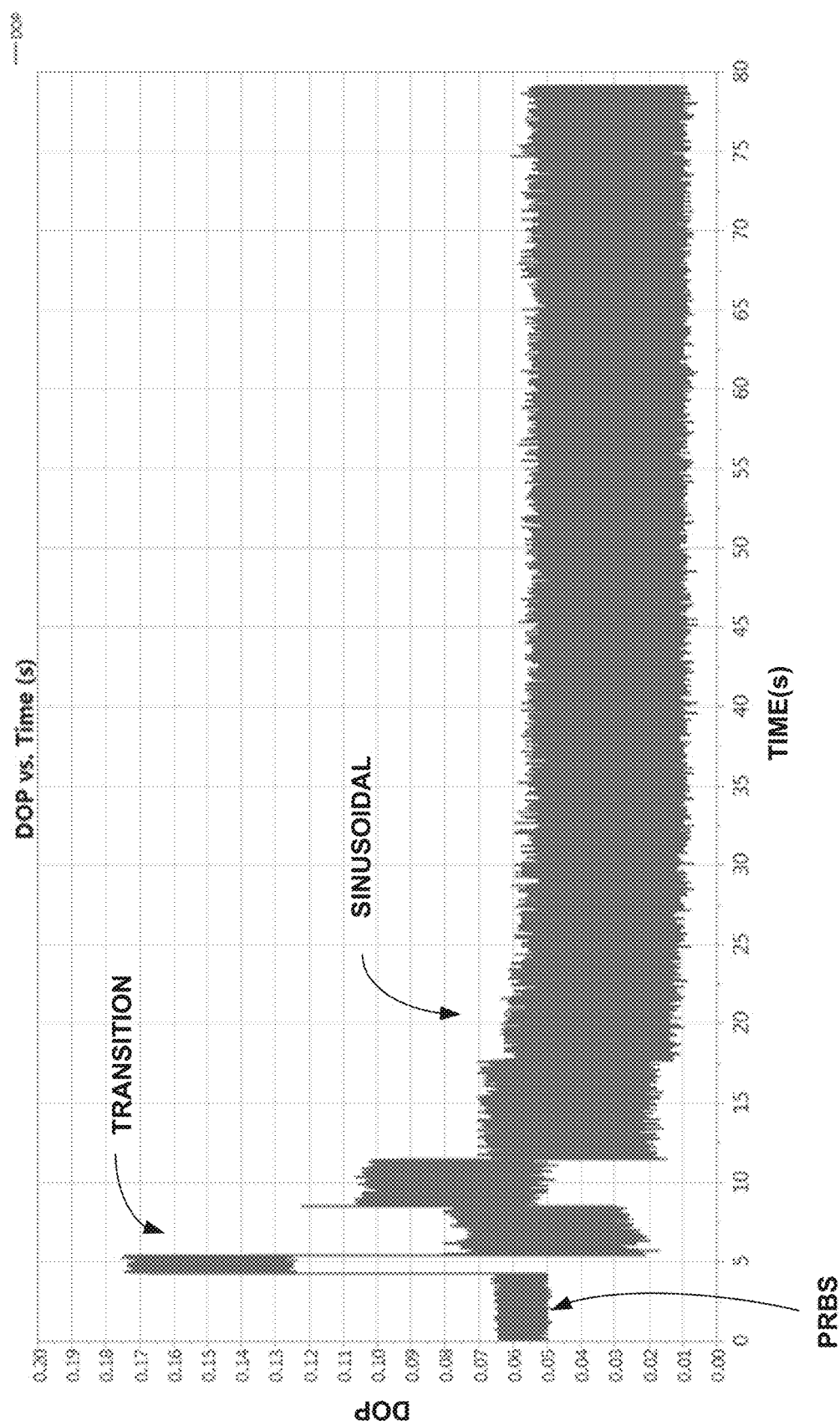
FIG. 10 is a graphical diagram illustrating a DOP for an optical signal generated from modulating with a PRBS signal followed by a sinusoidal signal with bias loop inactive.

FIG. 10 is a graphical diagram illustrating a DOP for an optical signal generated from modulating with a PRBS signal followed by a sinusoidal signal. In this example, the parameters are similar to those of FIG. 9; however, after the transition from the PRBS signals to the sinusoidal signals, the bias loop is deactivated and the lock points of the bias loop are set to the points determined during when the optical signal was generated from the PRBS signals. In FIG. 10, for the sinusoidal signal with inactive bias loop, the DOP may be less than 0.05.

Figure 11A:
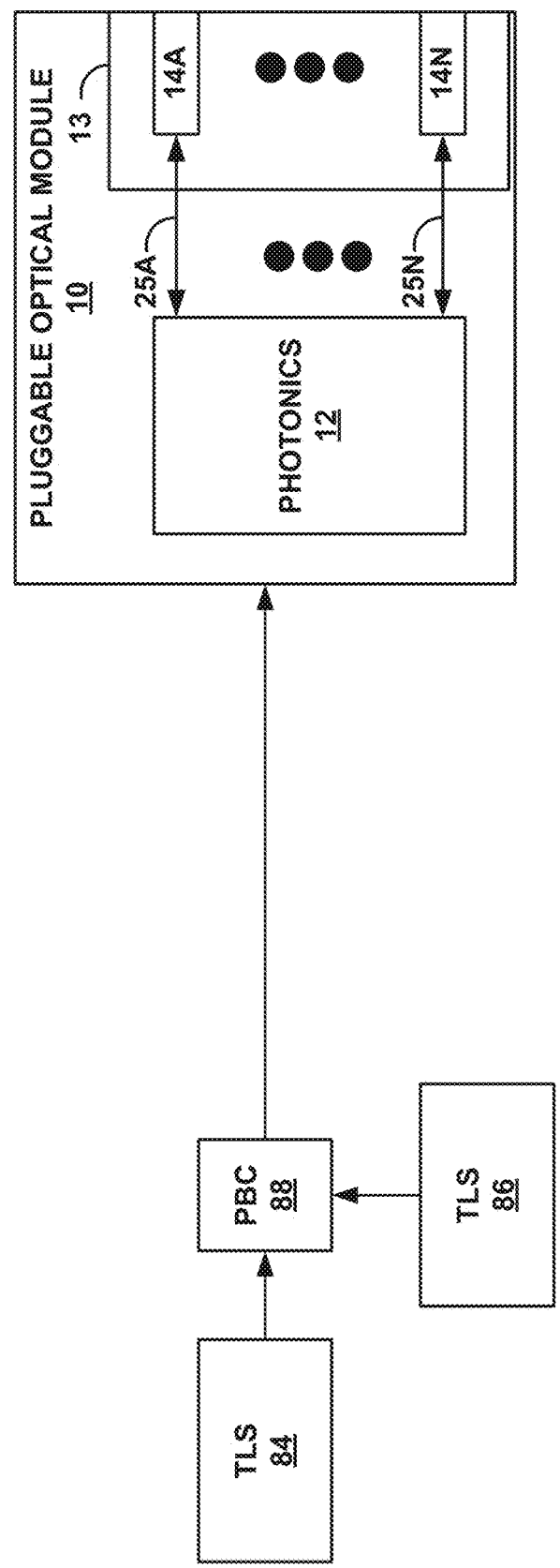
FIG. 11A is a block diagram illustrating another way in which to generate an optical signal having equal power on a first polarization and a second polarization.

FIG. 11A is a block diagram illustrating another way in which to generate an optical signal having equal power in a first polarization and a second polarization. In the techniques described in this disclosure, having the output of pluggable optical module 10 fed back into the input of pluggable optical module 10 or having the output of a different pluggable optical module fed into the input of pluggable optical module 10 for characterizing the front end 18 with an optical signal having X polarization and Y polarization that are not coherent with one another is one example. As another example, as illustrated in FIG. 11A, a first tunable laser source (TLS) 84 and a second TLS 86 output respective optical signals to polarization beam combiner (PBC) 88. In one example, the polarization of the optical signal outputted by TLS 84 and polarization of the optical signal outputted by TLS 86 may be different. In the event that the polarization of the optical signal outputted by TLS 84 is the same as the polarization of the optical signal outputted by TLS 86, a polarization rotator may be coupled to one of TLS 84 or TLS 86 so that the polarization of the resulting optical signal is different than that of TLS 84 or TLS 86.

PBC 88 receives the respective optical signals and combines them to generate a combined optical signal that pluggable optical module 10 receives. In this example, because TLS 84 and TLS 86 are completely decoupled from one another, there is no coherency between their respective optical signals, even though TLS 84 and TLS 86 are tuned to the same frequency. Therefore, even if optical link 30 cannot maintain the state of polarization, because the optical signals are already not coherent there may not be much effect from the inability of optical link 30 to maintain the state of polarization.

In this example, a controller, such as controller 33 of FIG. 2, may adjust the frequency of the optical signal that TLS 84 and TLS 86 output to sweep the baseband frequency so that processor 24 can determine the skew and frequency response of the front end 18. Also, as above, the frequency of the optical signal that TLS 84 and TLS 86 output may be kept constant and the frequency of local oscillator 44 may be changed to perform the frequency sweep for determining the frequency response. In these examples, the TIA may be kept in manual mode to properly determine the front end 18 characteristics.

Figure 11B:
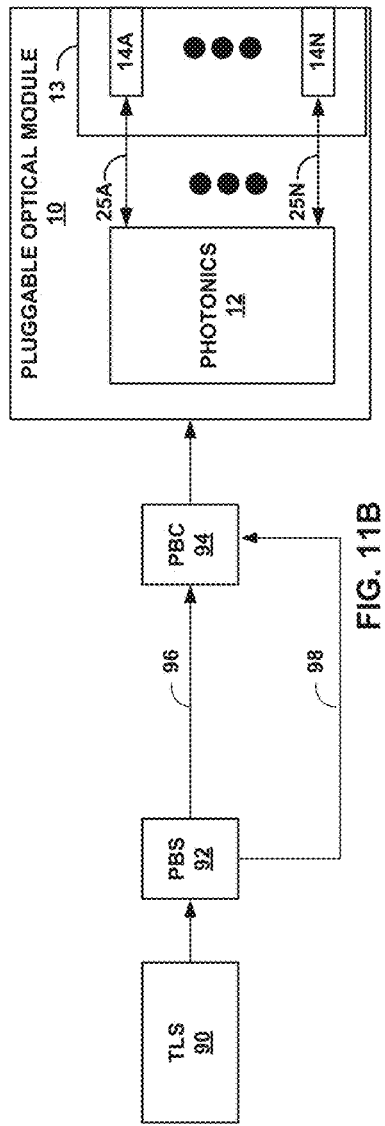
FIG. 11B is a block diagram illustrating another way in which to generate an optical signal having equal power on a first polarization and a second polarization.

FIG. 11B is a block diagram illustrating another way in which to generate an optical signal having equal power in a first polarization and a second polarization. The example illustrated in FIG. 11B provides for a way to generate an optical signal having X polarization and Y polarization where the two polarizations are not coherent, but using only one tunable laser source: TLS 90. In this example, TLS 90 outputs an optical signal having both X polarization and Y polarization, where the polarizations are coherent with one another. PBS 92 receives the optical signal, splits the optical signal, and transmits one portion of the optical via path 96 and other portion of the optical signal via path 98. PBC 94 combines the optical signals from the different paths, and outputs the resulting optical signal to pluggable optical module 10. In this example, the lengths of path 98 and 96 are different. For instance, if the difference in the distance between path 98 and path 96 is greater than a coherence length of TLS 90, then the coherency between the X polarization and the Y polarization may be lost. Therefore, the output of PBC 94 may be an optical signal where the X polarization and the Y polarization are not coherent with one another. The polarization maintaining fiber, instead of single mode fiber, may be used in path 96 and path 98 to maintain the polarization state along those paths. This should ensure that the combined output after PBC 94 is de-polarized.

Figure 11C:
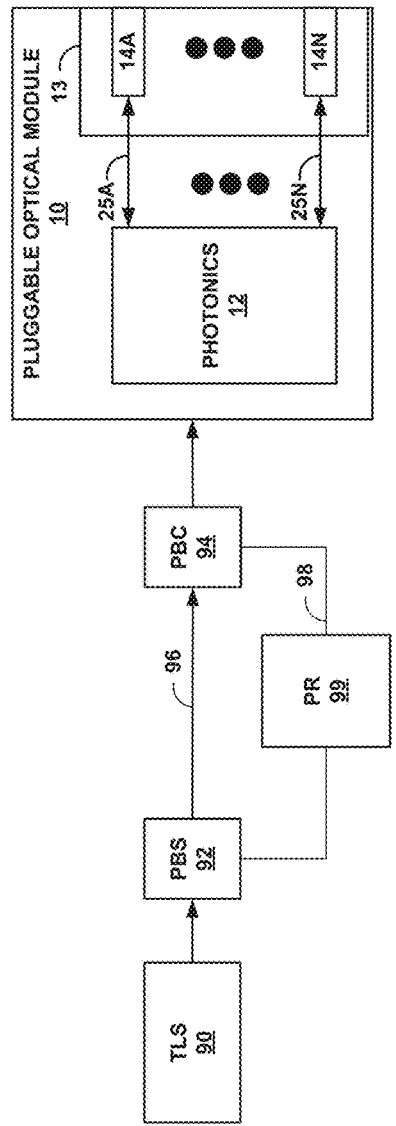
FIG. 11C is a block diagram illustrating another way in which to generate an optical signal having equal power on a first polarization and a second polarization.
Figure 12A:
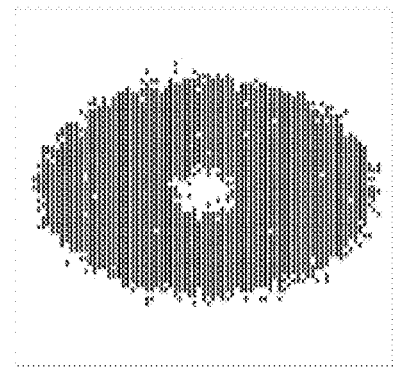
FIG. 12A-12D are graphical diagrams illustrating the quadrature versus in-phase outputs for a first polarization when a polarization multiplexed laser source with degree of polarization close to zero, is used as input.
Figure 12B:
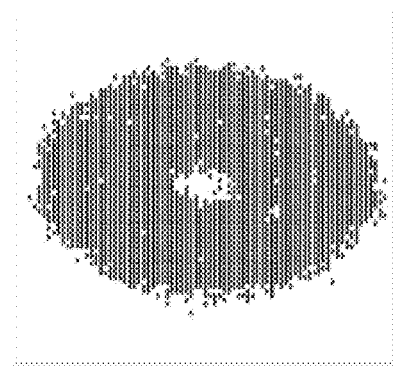
Figure 12C:
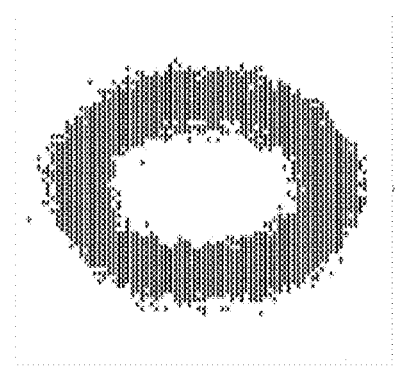
Figure 12D:
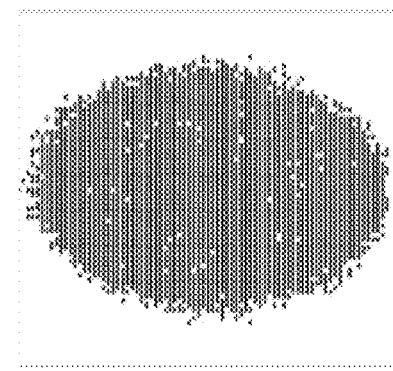
Figure 13A:
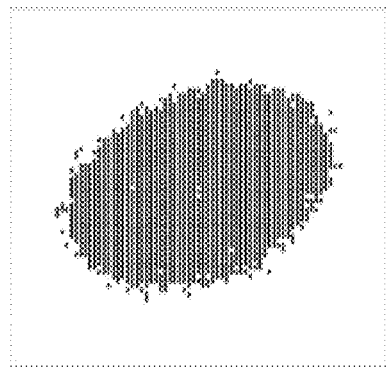
FIG. 13A-13D are graphical diagrams illustrating the quadrature versus in-phase outputs for a second polarization when a polarization multiplexed laser source with degree of polarization close to zero, is used as input.
Figure 13B:
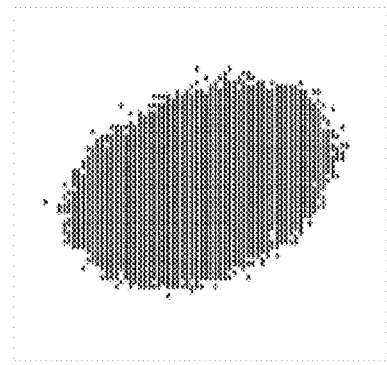
Figure 13C:
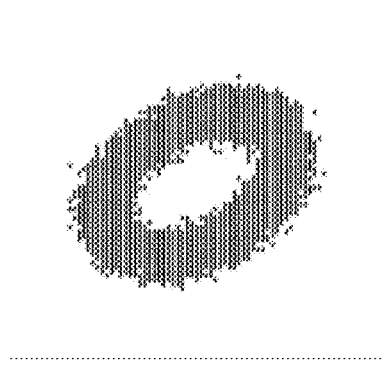
Figure 13D:
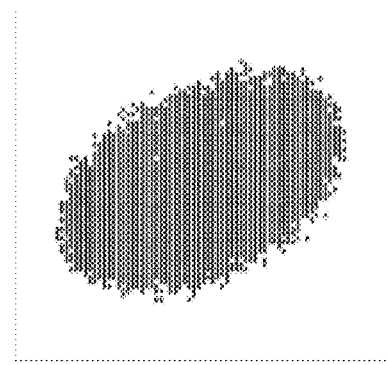

FIG. 11C is a block diagram illustrating another way in which to generate an optical signal having equal power in a first polarization and a second polarization. The example illustrated in FIG. 11C is substantially similar to that of FIG. 11B. However, in the example illustrated in FIG. 11C, path 98 includes polarization rotator (PR) 99 that rotates the polarization state by 90 degrees. PR 99 may be part of path 96 in other examples.

FIGS. 11A-11C illustrate additional ways in which to generate a polarization-multiplexed optical signal that includes a first portion having a first polarization and a second portion having a second polarization, where the first portion and the second portion are not coherent with one another and a power of the first portion is equal to a power of the second portion. For instance, one way to generate the polarization-multiplexed optical signal is with two laser sources: TLS 84 and TLS 86, as illustrated in FIG. 11A. Another way to generate the polarization-multiplexed optical signal is with one laser source, TLS 90, and two separate paths 96, 98 where the difference in length of the two separate paths is greater than a coherence length of TLS 90, as illustrated in FIG. 11B. Another way to generate the polarization-multiplexed optical signal is with one laser source TLS 90. A beam splitter 92 equal splits the output to two separate paths 96, 98 where the difference in length of the two separate paths is greater than a coherence length of TLS 90. In one path, a polarization rotator 99 rotates the polarization state by 90 degree. Then a polarization beam combiner 94 is used to combine the output from two paths, as illustrated in FIG. 11C. Another way to generate the polarization-multiplexed optical signal is by modulating the X polarization tributary channel and Y polarization tributary channel at different frequencies, where a difference in the frequencies is greater than a laser spectral width of laser 34.

FIGS. 12A-12D are graphical diagrams illustrating the quadrature versus in-phase outputs for a first polarization when polarization multiplexed laser is used as input. FIGS. 13A-13D are graphical diagrams illustrating the quadrature versus in-phase outputs for a second polarization when polarization multiplexed laser is used as input. FIGS. 12A-12D and FIGS. 13A-13D are taken simultaneously. The first polarization in FIGS. 12A-12D is orthogonal with the second polarization in FIGS. 13A-13D.

In FIGS. 12A-12D, the x-axis is the XI output of an ADC within processor 24 (e.g., ADCs 56A-56D) and the y-axis is the XQ output of an ADC within processor 24, and in FIGS. 13A-13D, the x-axis is the YI output of an ADC (e.g., ADCs 56A-56D) within processor 24, and the y-axis is the YQ output of an ADC within processor 24. The input for FIGS. 12A-12D and 13A-13D is an optical signal generated from a polarization multiplexed laser source with DOP close to 0. To demonstrate the robustness of polarization-multiplexed laser source against any effect of polarization rotation introduced by optical link 30, a polarization scrambler is put in optical link 30 to randomly rotate the polarization. Each sub-figure in FIGS. 12A-12D and 13A-13D is taken with different polarization rotation effect introduced. All the sub-figures are similar, which clearly demonstrate that there is always equal amount of power injected in both X arm and Y arm of coherent receiver 20 (e.g., into optical hybrid mixers 48A and 48B).

Figure 14:
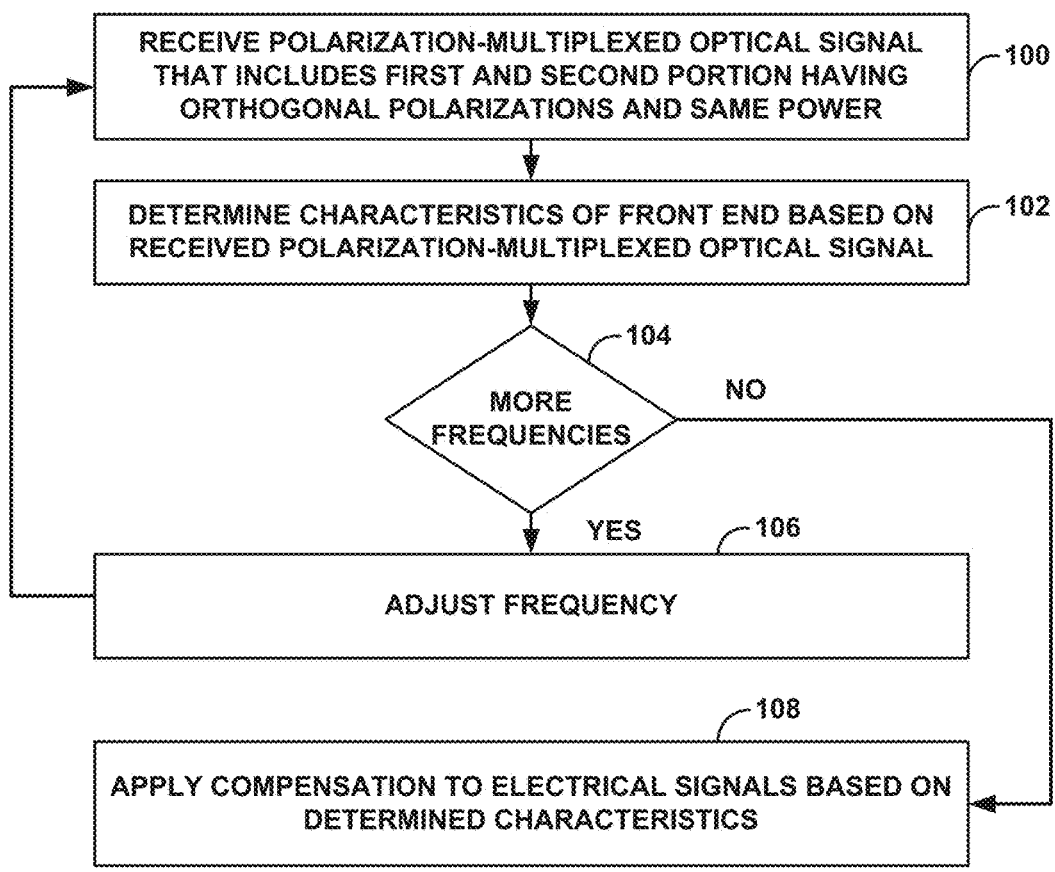
FIG. 14 is a flowchart illustrating an example technique in accordance with one or more aspects of this disclosure.

FIG. 14 is a flowchart illustrating an example technique in accordance with one or more aspects of this disclosure. A coherent receiver 20 having optical module 10 receives a polarization-multiplexed optical signal that includes a first portion having a first polarization and a second portion having a second polarization, where the first portion and the second portion are not coherent with one another and a power of the first portion is equal to a power of the second portion (100). For example, the coherent receiver 20 receives the polarization-multiplexed optical signal that is generated from a first optical signal that is modulated at a first frequency and having a first polarization and a second optical signal that is modulated at a second, different frequency and having a second, different polarization. The degree of polarization of the polarization-multiplexed optical signal is approximately zero, and the difference between the first frequency and the second frequency is greater than a spectral width of laser 34 whose lightwave is used to generate the first optical signal and the second optical signal. The first optical signal may be a first optical signal having sinusoidal modulation at the first frequency, and the second optical signal may be a second optical signal having sinusoidal modulation at the second frequency.

As one example, pluggable optical module 10 or another optical module, receives a first electrical signal having the first frequency and a second electrical signal having the second frequency. Optical module 10 (e.g., via optical modulators 38A and 38B) modulates a lightwave (e.g., generated from laser 34) with the first electrical signal and modulates the lightwave with the second electrical signal to generate the first optical signal that is modulated at the first frequency and the second optical signal that is modulated at the second frequency, respectively. Optical module 10 (e.g., via PBC 40) combines the first optical signal and the second optical signal to generate the polarization-multiplexed optical signal and transmits the polarization-multiplexed optical signal.

In such examples, drive amplifiers 37A-37D may be configured to provide linear gain. For instance, one or more drive amplifiers 37A-37D amplify the received first electrical signal and the received second electrical signal. Modulating the lightwave with the first electrical signal includes modulating the lightwave with the first electrical signal that is amplified by a first set of drive amplifiers (e.g., drive amplifiers 37A and 37B) of the one or more drive amplifiers, and modulating the lightwave with the second electrical signal includes modulating the lightwave with the second electrical signal that is amplified by a second set of drive amplifiers (e.g., drive amplifiers 37C and 37D) of the one or more drive amplifiers.

As another example, the polarization-multiplexed optical signal may be an optical signal generated from a combination of two different, de-coupled laser sources (e.g., TLS 84 and TLS 86). As yet another example, the polarization-multiplexed optical signal may be an optical signal generated from combining two optical signals traveling via different optical paths. The two optical signals are generated from a single laser source (e.g., TLS 90) being split by polarization beam splitter 92, and the difference in length between the optical paths is greater than the coherence length of TLS 90 (e.g., of the single laser source).

In some examples, prior to transmitting the polarization-multiplexed optical signal, optical module 10 transmits a data optical signal (e.g., an optical signal that is generated by modulating with a data pattern such as a PRBS signal). Processor 24 determines a bias loop lock point during the transmission of the data optical signal. In this example, PBC 40 transmits the polarization-multiplexed optical signal with a bias loop locked at the bias loop lock point (e.g., the bias point for modulators 38A and 38B is locked to the bias point determined during the transmission of the data optical signal).

Processor 24 determines characteristics of front end 18 of the electronic device based on the received polarization-multiplexed optical signal (102). As one example, processor 24 determines a skew of outputs from ADCs 56A-56D of front end 18 based on the received polarization-multiplexed optical signal (e.g., based on the determined angle of tilt). Processor 24 corrects the skew of the output of the ADCs 56A-56D. In such examples, processor 24 (e.g., via characterization unit 69) determines one or more of a frequency response and gain imbalance of the front end 18 based on the output of ADCs 56A-56D with the skew correction.

Processor 24 may determine whether there are more operation frequencies that need to be checked for characterizing the front end 18 (104). If processor 24 determines that there are more frequencies to check (YES of 104), processor 24 may cause the operation frequency to be adjusted (106) and repeat these steps until there are no more operation frequencies that need to be checked.

As one example, optical hybrid mixers 48A and 48B may mix each one of a plurality of optical signals having different frequencies generated from local oscillator 44 with the received polarization-multiplexed optical signal to generate a plurality of electrical signals. In this example, characterization unit 69 determines the characteristics of the front end 18 based on the plurality of electrical signals.

As another example, the optical baseband frequency of the polarization-multiplexed optical signal may be changing (e.g., controller 35 causes laser 34 to output the lightwave at different frequencies). In this example, for each optical carrier frequency, characterization unit 69 determines the characteristics of the front end 18 based on the resulting electrical signals generated from the polarization-multiplexed optical signal for each optical carrier frequency.

If there are no more operation frequencies to check (NO of 104), processor 24 applies compensation to electrical signals received by the coherent receiver 20 based on the determined characteristics (108). For example, characterization unit 69 may configure processor 24 into a normal operation mode where photonics 12 receives optical signal from network 32 and outputs the resulting electrical signals to processor 24 for further processing. However, prior to processing, processor 24 may apply compensation to compensate for the impairments on the electrical signals caused by the characteristics of the front end 18.

After characterization, processor 24 instructs coherent transmitter to switch modulation source from sinusoidal type of signals to normal data traffic. Processor 24 enables the active bias control loop for coherent transmitter. Processor 24 may configure the TIA in coherent receiver 20 to automatic gain control mode.

In some examples, the results from characterization unit 69 may also be used for diagnostic purposes. For instance, if characterization unit 69 determines that the characteristics of the front end 18 are within a tolerable range, but the bit error ratio is still too high, the cause may be something other than the front end 18.

Also, in the above techniques the polarization-multiplexed optical signal that the coherent receiver 20 receives may not be ideal due to the imperfections of the coherent transmitter. In some examples, characterization unit 69 may determine the effects of the coherent transmitter of optical module 10 using any one of various techniques, and characterization unit 69 may remove the effects of the coherent transmitter in determining the characteristics of the front end 18.

The techniques of this disclosure may be implemented in a wide variety of devices or apparatuses, including linecards, routers, optical interfaces, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

What is claimed is:

1. A method for optical communication, the method comprising:
   receiving, with an optical module of a receiver, a polarization-multiplexed optical signal that includes a first portion having a first polarization and a second portion having a second polarization, wherein the first portion and the second portion are not coherent with one another and a power of the first portion is equal to a power of the second portion;
   determining, with a processor, characteristics of a front end of the receiver based on the received polarization-multiplexed optical signal, the front end comprising components of the optical module for converting optical signals into analog electrical signals, components of the receiver for converting the analog electrical signals into digital signals, and components and traces of the receiver that interconnect the optical module and the processor, wherein the front end comprises an analog-to-digital converter (ADC), and wherein determining the characteristics comprises at least:
      determining, with the processor, a skew of an output of the ADC based on the received polarization-multiplexed optical signal;
      correcting the skew of the output of the ADC; and
      determining one or more of a frequency response and gain imbalance of the front end based on the output of the ADC with the skew correction; and
   applying, with the processor, compensation to electrical signals received by the processor based on one or more of the determined frequency response and gain imbalance.

2. The method of claim 1, wherein receiving the polarization-multiplexed optical signal comprises receiving the polarization-multiplexed optical signal that is generated from a first optical signal that is modulated at a first frequency and having the first polarization and a second optical signal that is modulated at a second, different frequency and having the second, different polarization.

3. The method of claim 2, wherein the first optical signal that is modulated at the first frequency comprises an optical signal having a periodic signal having a narrowband frequency spectrum at around the first frequency, and wherein the second optical signal modulated at the second frequency comprises an optical signal having a periodic signal having a narrowband frequency spectrum at around the second frequency.

4. The method of claim 2, wherein a difference between the first frequency and the second frequency is greater than a spectral width of a laser whose lightwave is used to generate the first optical signal and the second optical signal.

5. The method of claim 2, further comprising:
   receiving, from the processor with the optical module, a first electrical signal having the first frequency and a second electrical signal having the second frequency;
   splitting, with a beam splitter of the optical module, a light of a laser of the optical module into a first lightwave and a second lightwave;

modulating, with the optical module, the first lightwave with the first electrical signal to generate the first optical signal that is modulated at the first frequency;

modulating, with the optical module, the second lightwave with the second electrical signal to generate the second optical signal that is modulated at the second frequency;

rotating, with a polarization rotator of the optical module, polarization of the first optical signal;

combining, with the optical module, the first optical signal having the rotated polarization and the second optical signal to generate the polarization-multiplexed optical signal; and transmitting, with the optical module, the polarization-multiplexed optical signal.

6. The method of claim 5, further comprising:

prior to transmitting the polarization-multiplexed optical signal, transmitting, with the optical module, a data optical signal; and determining a bias loop lock point during the transmission of the data optical signal, wherein transmitting the polarization-multiplexed optical signal comprises transmitting the polarization-multiplexed optical signal with a bias loop locked at the bias loop lock point.

7. The method of claim 5, further comprising:

amplifying the received first electrical signal and the received second electrical signal with a plurality of drive amplifiers of the optical module, wherein the plurality of drive amplifiers are configured to provide linear gain;

wherein modulating the lightwave with the first electrical signal comprises modulating the lightwave with the first electrical signal that is amplified by a first set of the plurality of drive amplifiers, and wherein modulating the lightwave with the second electrical signal comprises modulating the lightwave with the second electrical signal that is amplified by a second set of the plurality of drive amplifiers.

8. The method of claim 1, further comprising:

mixing each one of a plurality of optical signals having different frequencies generated from a local oscillator of the optical module with the received polarization-multiplexed optical signal to generate a plurality of electrical signals, wherein determining the characteristics of the front end of the receiver based on the received polarization-multiplexed optical signal comprises determining the characteristics of the front end based on the plurality of electrical signals generated from the mixing of the received polarization-multiplexed optical signal.

9. The method of claim 1, wherein receiving the polarization-multiplexed optical signal comprises receiving the polarization-multiplexed optical signal having a changing optical carrier frequency.

10. The method of claim 1, wherein the degree of polarization of the polarization-multiplexed optical signal is approximately zero.

11. The method of claim 1, wherein receiving the polarization-multiplexed optical signal comprises receiving an optical signal generated from a combination of two different, de-coupled laser sources.

12. The method of claim 1, wherein receiving the polarization-multiplexed optical signal comprises receiving an optical signal generated from combining via a polarization beam combiner two optical signals traveling via different polarization-maintaining optical paths, wherein the two optical signals are generated from a single laser source with output of the single laser source being split by a polarization beam splitter, and wherein a difference in a length between the optical paths is greater than a coherence length of the single laser source.

13. The method of claim 1, wherein receiving the polarization-multiplexed optical signal comprises receiving an optical signal generated from combining via a polarization beam combiner two optical signals traveling via different polarization-maintaining optical paths, wherein the two optical signals are generated from a single laser source with output of the single laser source being split by a beam splitter, and wherein a difference in a length between the optical paths is greater than a coherence length of the single laser source, and wherein the polarization in one path is rotated by a polarization rotator.

14. An electronic device for optical communication, the electronic device comprising:

a receiver having an optical module configured to receive a polarization-multiplexed optical signal that is generated from a first optical signal that is modulated at a first frequency and having a first polarization and a second optical signal that is modulated at a second, different frequency and having a second, different polarization, wherein the polarization-multiplexed optical signals includes a first portion having the first polarization and a second portion having the second polarization, and wherein the first portion and the second portion are not coherent with one another and a power of the first portion is equal to a power of the second portion; and a processor configured to:

determine characteristics of a front end of the receiver based on the received polarization-multiplexed optical signal, the front end comprising components of the optical module for converting optical signals into analog electrical signals, components of the receiver for converting the analog electrical signals into digital signals, and components and traces of the receiver that interconnect the optical module and the processor; and apply compensation to electrical signals received by the processor based on the determined characteristics.

15. The electronic device of claim 14, wherein the first optical signal that is modulated at the first frequency comprises an optical signal having a periodic signal having a narrowband frequency spectrum at around the first frequency, and wherein the second optical signal modulated at the second frequency comprises an optical signal having a periodic signal having a narrowband frequency spectrum at around the second frequency.

16. The electronic device of claim 14, wherein a difference between the first frequency and the second frequency is greater than a spectral width of a laser whose lightwave is used to generate the first optical signal and the second optical signal.

17. The electronic device of claim 14, wherein the optical module is configured to:

receive, from the processor, a first electrical signal having the first frequency and a second electrical signal having the second frequency;

split, with a beam splitter of the optical module, a light of a laser of the optical module into a first lightwave and a second lightwave;

modulate the first lightwave with the first electrical signal to generate the first optical signal that is modulated at the first frequency;

modulate the second lightwave with the second electrical signal to generate the second optical signal that is modulated at the second frequency;

rotate, with a polarization rotator of the optical module, polarization of the first optical signal;

combine the first optical signal having the rotated polarization and the second optical signal to generate the polarization-multiplexed optical signal; and transmit the polarization-multiplexed optical signal.

18. The electronic device of claim 17, wherein the optical module is configured to transmit a data optical signal prior to transmitting the polarization-multiplexed optical signal, wherein the processor is configured to determine a bias loop lock point during the transmission of the data optical signal, and wherein the optical module is configured to transmit the polarization-multiplexed optical signal with a bias loop locked at the bias loop lock point.

19. The electronic device of claim 17, further comprising a plurality of drive amplifiers configured to provide linear gain and amplify the received first electrical signal and the received second electrical signal, wherein the optical module is configured to modulate the lightwave with the first electrical signal that is amplified by a first set of the plurality of drive amplifiers, and wherein the optical module is configured to modulate the lightwave with the second electrical signal that is amplified by a second set of the plurality of drive amplifiers.

20. The electronic device of claim 14, further comprising: an analog-to-digital converter of the front end, wherein the processor is configured to:
 determine a skew of an output of the ADC based on the received polarization-multiplexed optical signal;
 correct the skew of the output of the ADC; and
 determine one or more of a frequency response and gain imbalance of the front end based on the output of the ADC with the skew correction.

21. The electronic device of claim 14, further comprising: a local oscillator; and one or more optical hybrid mixers configured to mix each one of a plurality of optical signals having different frequencies generated from the local oscillator with the received polarization-multiplexed optical signal to generate a plurality of electrical signals, wherein to determine characteristics of the front end of the receiver based on the received polarization-multiplexed optical signal, the processor is configured to determine the characteristics of the front end based on the plurality of electrical signals generated from the mixing of the polarization-multiplexed optical signal.

22. The electronic device of claim 14, wherein the optical module is configured to receive the polarization-multiplexed optical signal having a changing optical carrier frequency.

23. The electronic device of claim 14, wherein the degree of polarization of the polarization-multiplexed optical signal is approximately zero.

24. The electronic device of claim 14, wherein the electronic device comprises one of:
 a line card; or
 a chassis that includes the line card, and wherein the line card includes the optical module and the processor.

25. A system for optical communication, the system comprising:
 a transmitter configured to transmit a polarization-multiplexed optical signal that includes a first portion having a first polarization and a second portion having a second polarization, wherein the first portion and the second portion are not coherent with one another and a power of the first portion is equal to a power of the second portion, wherein the transmitter comprises:
  a laser source;
  a beam splitter configured to split an optical signal from the laser source into a first optical signal and a second optical signal;
  a first optical path for carrying the first optical signal;
  a second optical path for carrying the second optical signal, wherein a difference in a length between the first optical path and the second optical path is greater than a coherence length of the laser source; and
  a beam combiner configured to combine an output from the first optical path and an output from the second optical path to generate the polarization-multiplexed optical signal; and
 an electronic device comprising:
  a receiver having an optical module configured to receive the polarization-multiplexed optical signal; and
  a processor configured to determine characteristics of a front end based on the received polarization-multiplexed optical signal, and apply compensation to electrical signals received by the processor based on the determined characteristics, wherein the front end comprises components of the optical module for converting optical signals into analog electrical signals, components of the receiver for converting the analog electrical signals into digital signals, and components and traces of the receiver that interconnect the optical module and the processor.

26. The system of claim 25, further comprising:
 a polarization rotator,
 wherein one of the first optical path or the second optical path includes the polarization rotator.

* * * * *